United States Patent
Oniwa et al.

(10) Patent No.: US 9,523,407 B2
(45) Date of Patent: Dec. 20, 2016

(54) ANTI-VIBRATION UNIT

(75) Inventors: Tatsuya Oniwa, Osaka (JP); Tomoyoshi Edo, Osaka (JP); Kenichi Koshikawa, Osaka (JP); Hironori Kato, Osaka (JP)

(73) Assignee: TOYO TIRE & RUBBER CO., LTD., Osaka-shi, Osaka (JP)

( * ) Notice: Subject to any disclaimer, the term of this patent is extended or adjusted under 35 U.S.C. 154(b) by 89 days.

(21) Appl. No.: 14/237,629

(22) PCT Filed: May 31, 2012

(86) PCT No.: PCT/JP2012/064191
§ 371 (c)(1),
(2), (4) Date: Jun. 9, 2014

(87) PCT Pub. No.: WO2013/021714
PCT Pub. Date: Feb. 14, 2013

(65) Prior Publication Data
US 2014/0326850 A1 Nov. 6, 2014

(30) Foreign Application Priority Data
Aug. 10, 2011 (JP) .................. 2011-174954

(51) Int. Cl.
*F16M 13/00* (2006.01)
*F16F 15/02* (2006.01)
(Continued)

(52) U.S. Cl.
CPC ............. *F16F 15/022* (2013.01); *F16F 13/08* (2013.01); *F16F 13/10* (2013.01)

(58) Field of Classification Search
CPC ............ F16F 15/022; F16F 15/02; F16F 9/00; F16F 5/00; F16F 15/08; F16F 1/37; F16F 3/0873; B62D 27/04; B62D 33/0604; F16M 7/00
(Continued)

(56) References Cited

U.S. PATENT DOCUMENTS 5,609,639 A * 3/1997 Walker .................. A61F 2/3868
    623/20.29
5,636,826 A * 6/1997 Nakagaki .................. F16F 7/00
    248/224.51
(Continued)

FOREIGN PATENT DOCUMENTS

JP     62-95959 U     6/1987
JP     2003-063321 A     3/2003
(Continued)

OTHER PUBLICATIONS

Office Action dated Dec. 2, 2014, issued in corresponding Chinese Patent Application No. 201280036363.X, with English Translation (15 pages).
(Continued)

*Primary Examiner* — Christopher E Garft
(74) *Attorney, Agent, or Firm* — Westerman, Hattori, Daniels & Adrian, LLP

(57) ABSTRACT

An anti-vibration unit, which enables a reduction in man-hours to be achieved during manufacturing and a reduction in the number of parts, is provided. A boss member of an anti-vibration device is pressed into a press-fitting section of a second bracket so as to be firmly fixed. The omission of the bolt enables a corresponding reduction in the number of parts. Moreover, by omitting the bolt in this way, there is no need to form a female threaded section on the boss member of the anti-vibration device, thus enabling a corresponding reduction in man-hours during manufacturing. In addition,
(Continued)

when chemically treating the boss member of the anti-vibration device, it is unnecessary to implement a step for protecting the female threaded section with a masking bolt, thus eliminating the need to attach and detach the masking bolt, which in turn enables a corresponding reduction in man-hours during manufacturing.

8 Claims, 26 Drawing Sheets

(51) Int. Cl.
*F16F 13/10* (2006.01)
*F16F 13/08* (2006.01)

(58) Field of Classification Search
USPC .......... 248/223.21, 225.11, 223.41, 223.51,2
48/224.61, 496–497, 297.21; 403/359.3
See application file for complete search history.

(56) References Cited

U.S. PATENT DOCUMENTS

| | | | |
|---|---|---|---|
| 7,278,633 | B2* | 10/2007 | Yamamoto ............ F16F 13/108 267/140.13 |
| 2003/0088940 | A1 | 5/2003 | Nakagaki et al. |
| 2005/0225015 | A1* | 10/2005 | Sakata .................... F16F 13/10 267/140.13 |

FOREIGN PATENT DOCUMENTS

| | | |
|---|---|---|
| JP | 2003-139182 A | 5/2003 |
| JP | 2003-139188 A | 5/2003 |
| JP | 2008-169548 A | 7/2008 |
| JP | 2008-169857 A | 7/2008 |
| JP | 2009-014080 A | 1/2009 |

OTHER PUBLICATIONS

International Search Report dated Aug. 21, 2012, issued in corresponding application No. PCT/JP2012/064191.

* cited by examiner

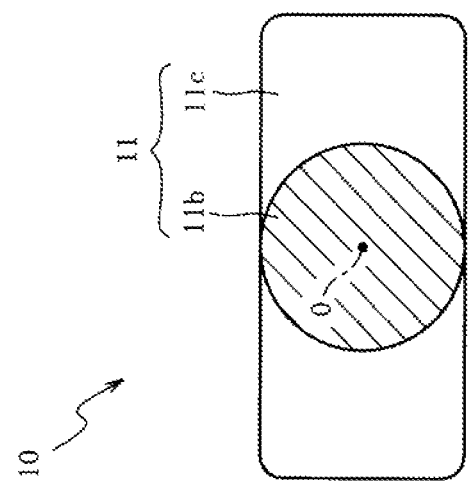
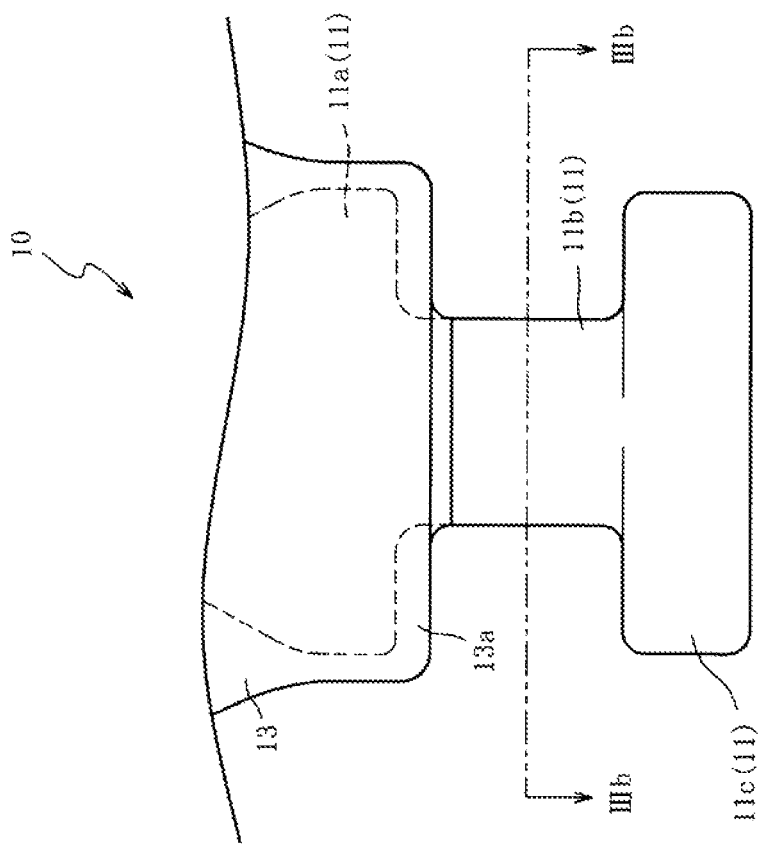

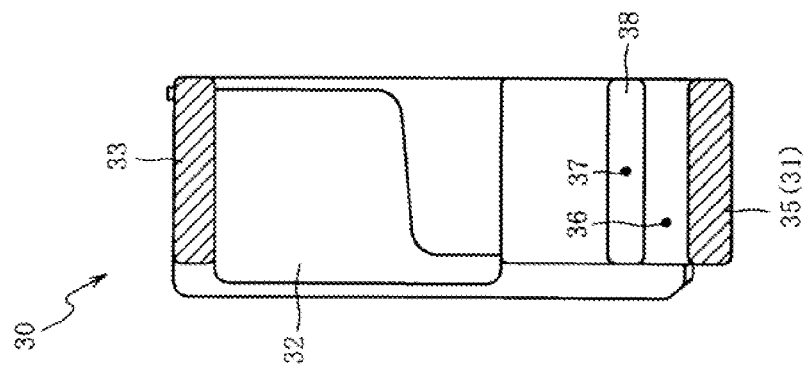
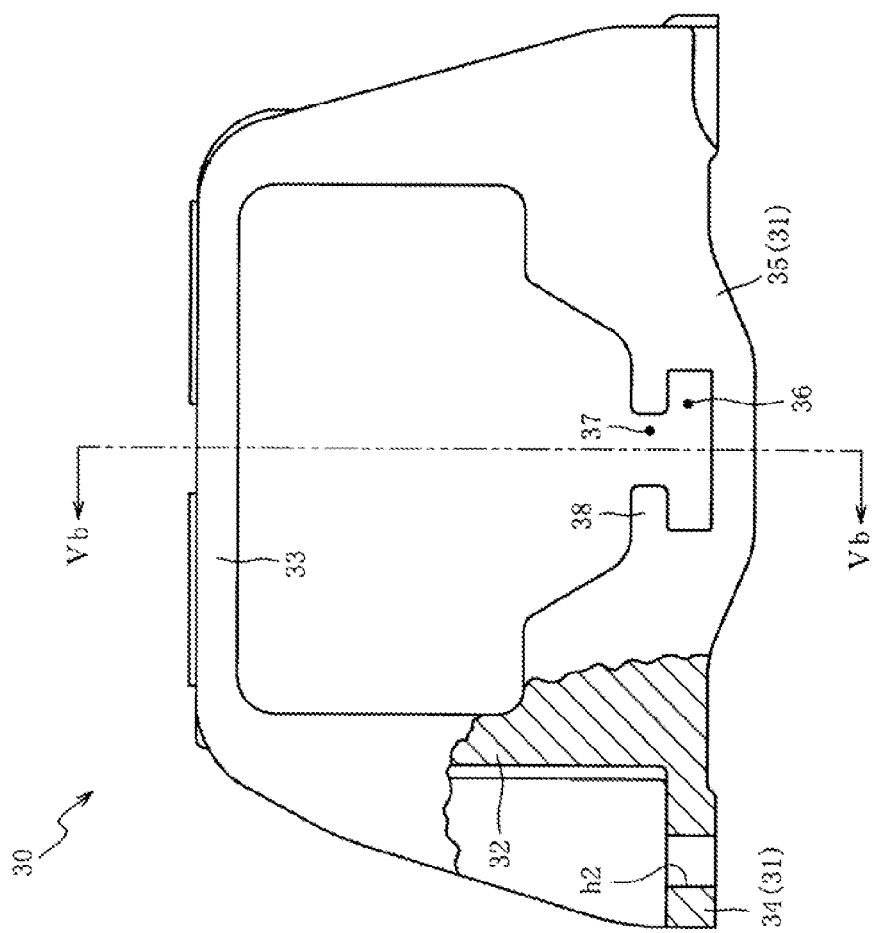
FIG. 5B
FIG. 5A

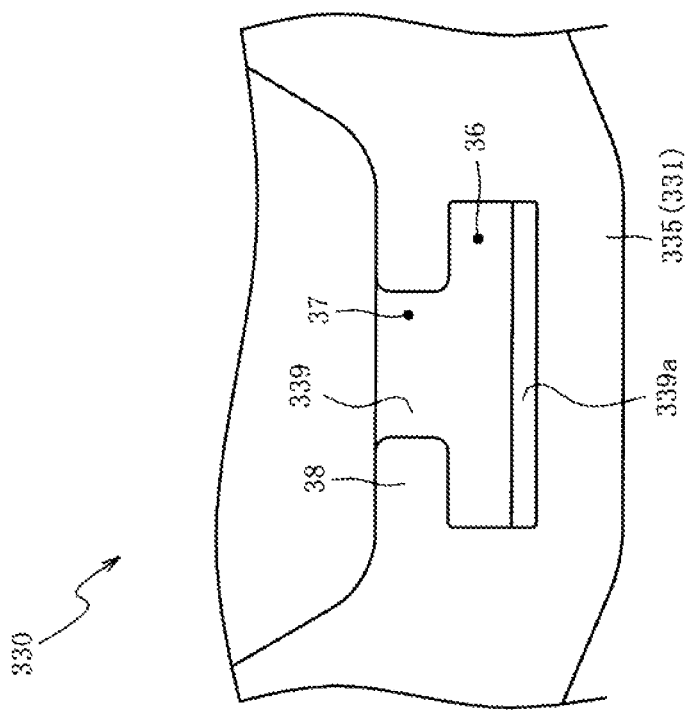
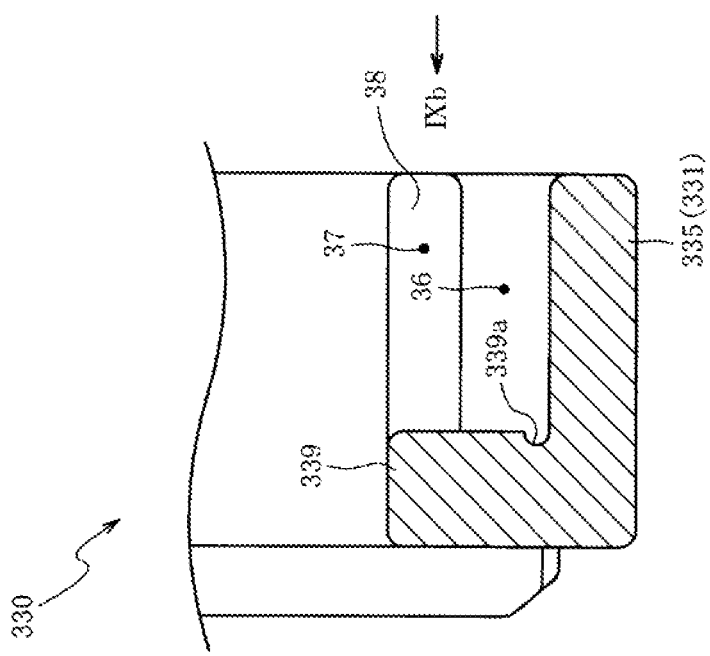

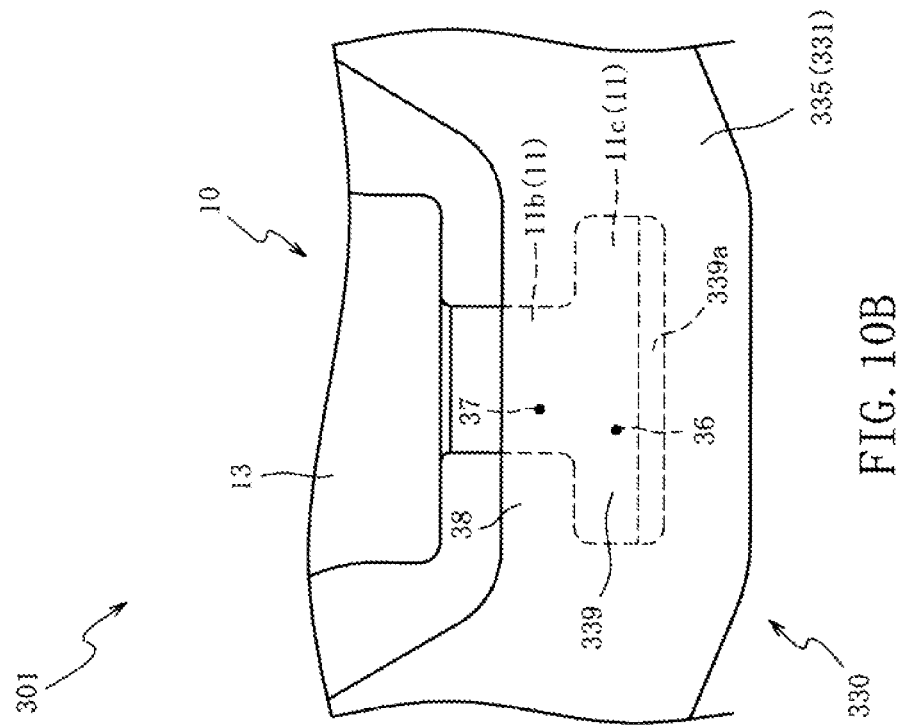
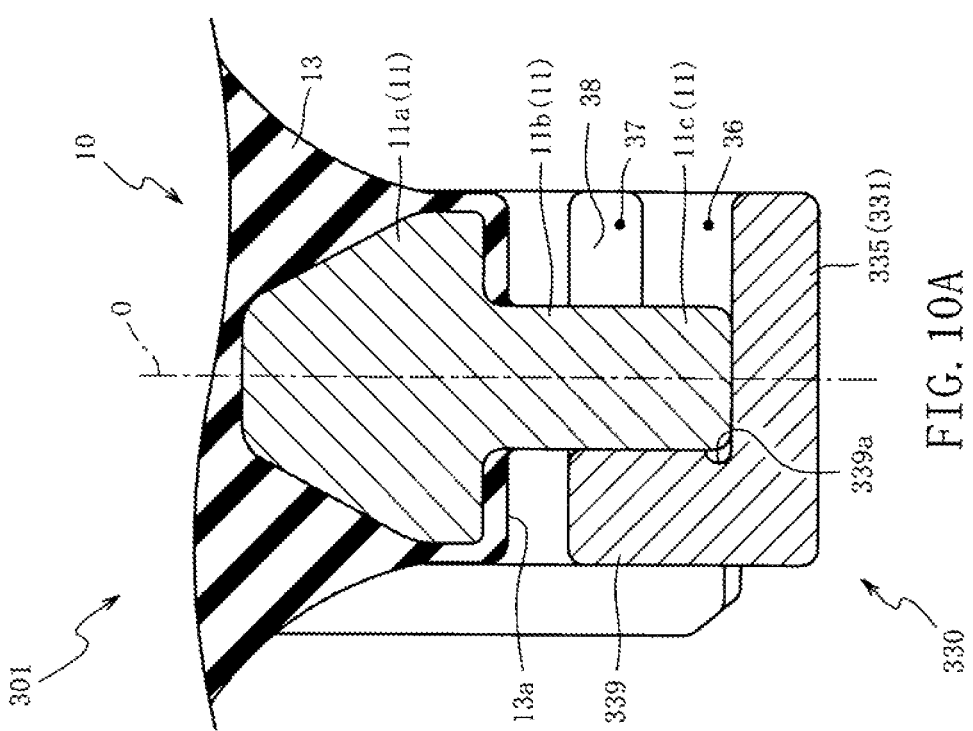

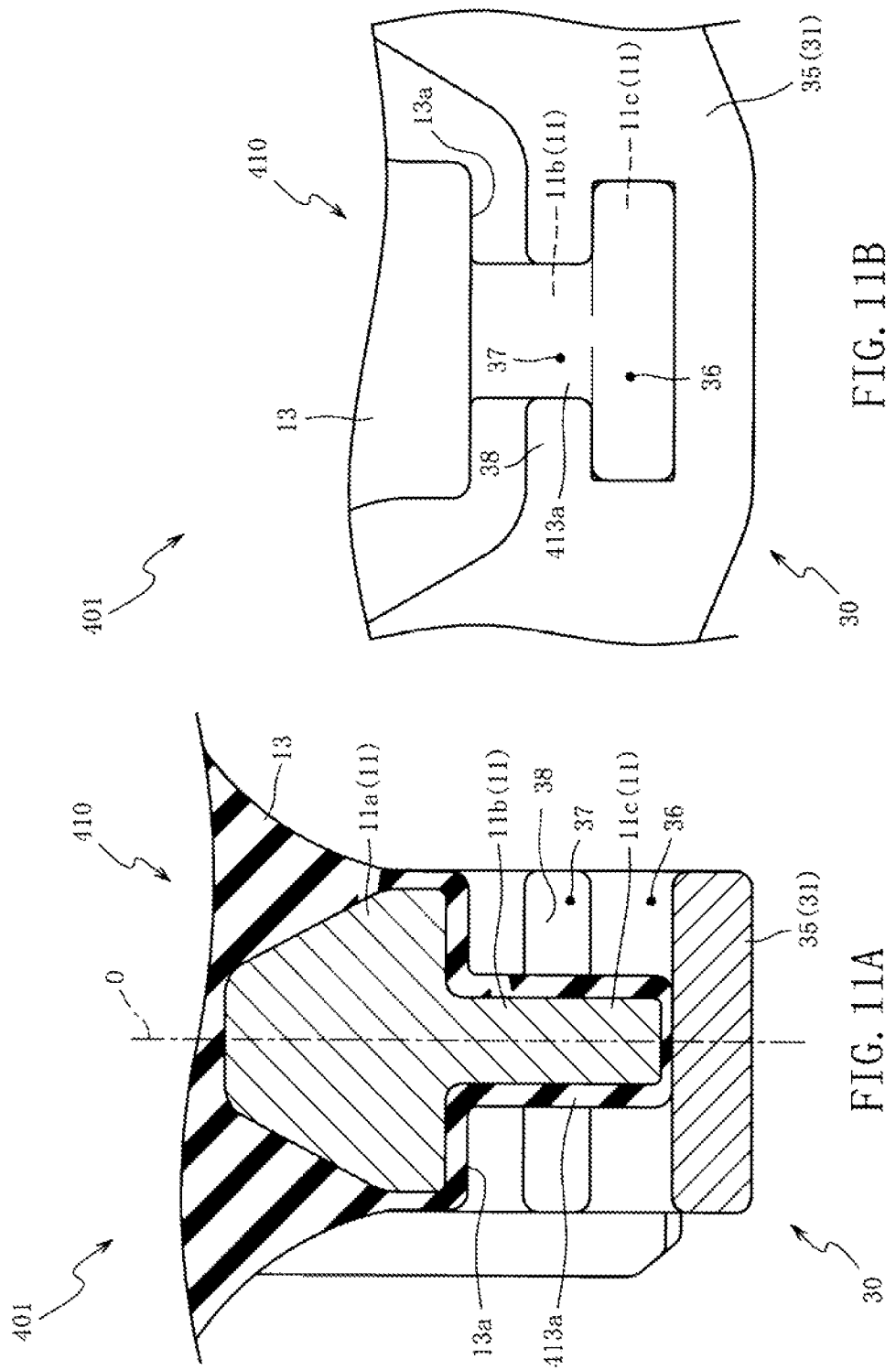

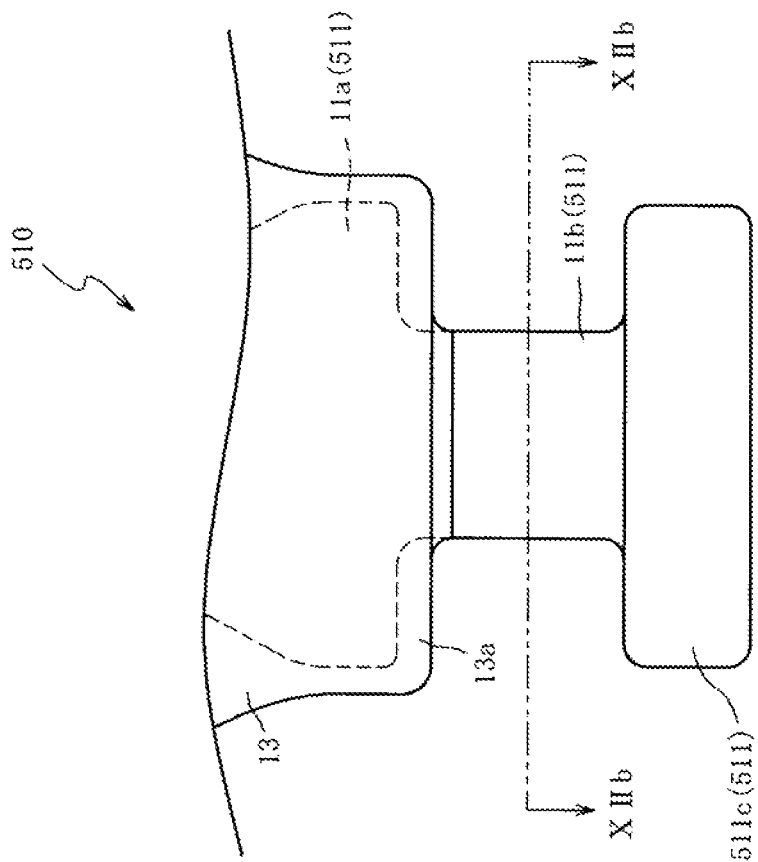
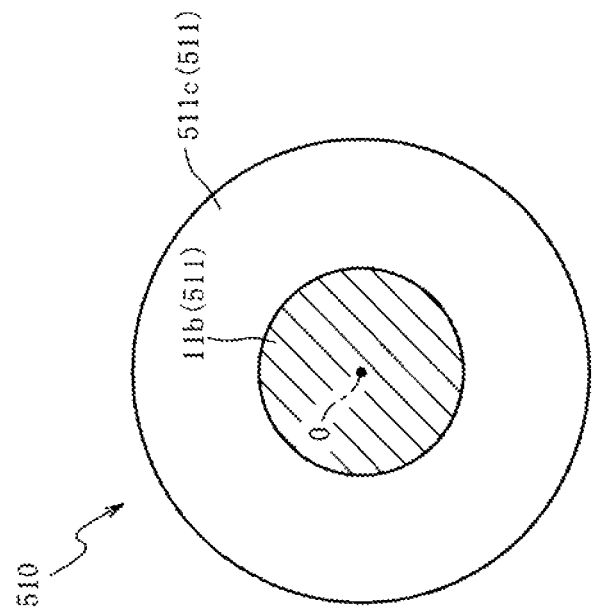
FIG. 12A
FIG. 12B

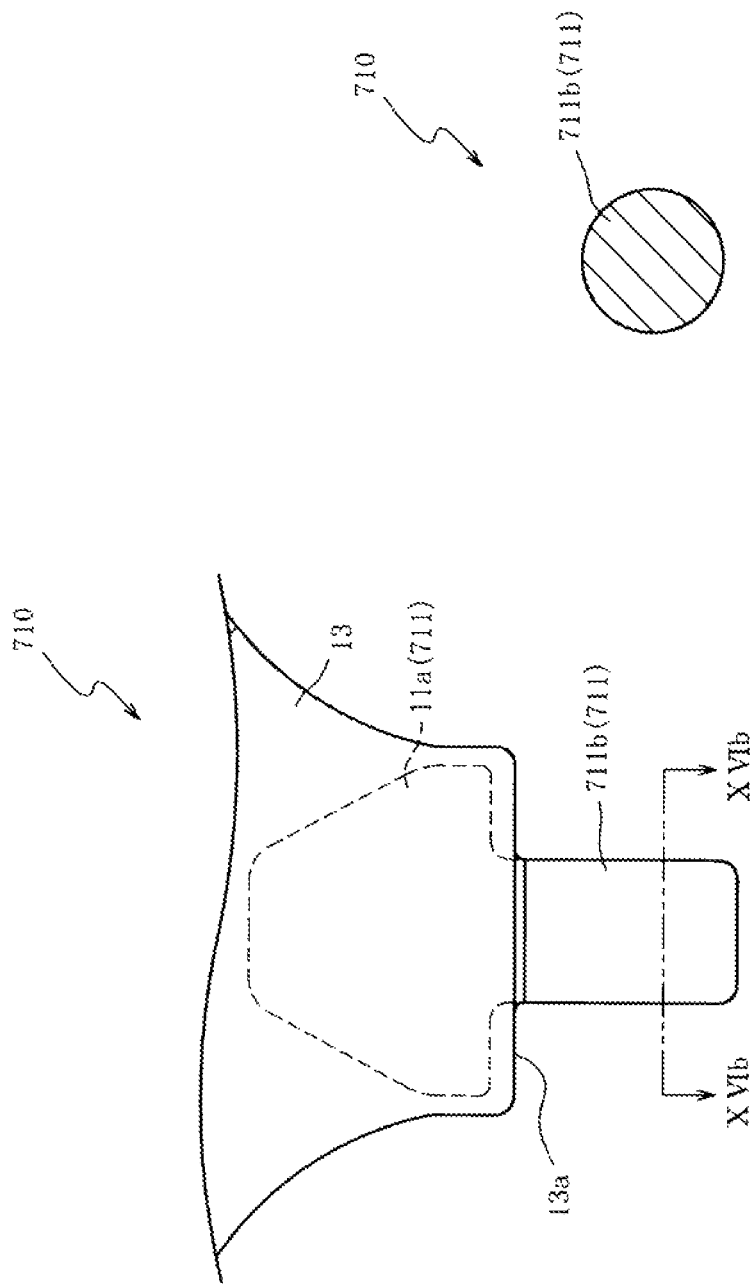

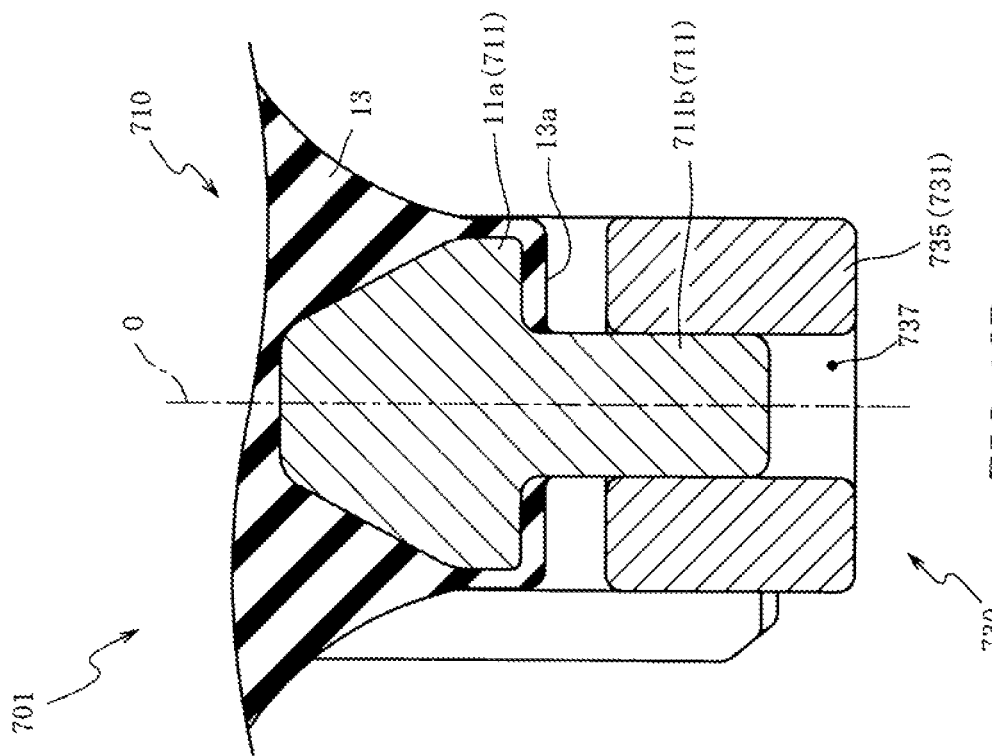
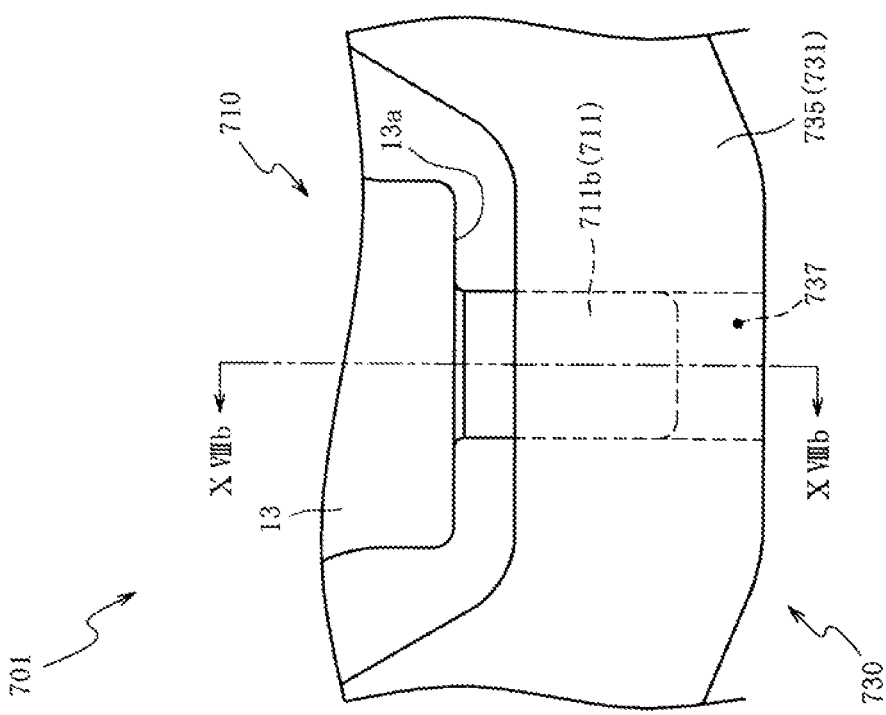

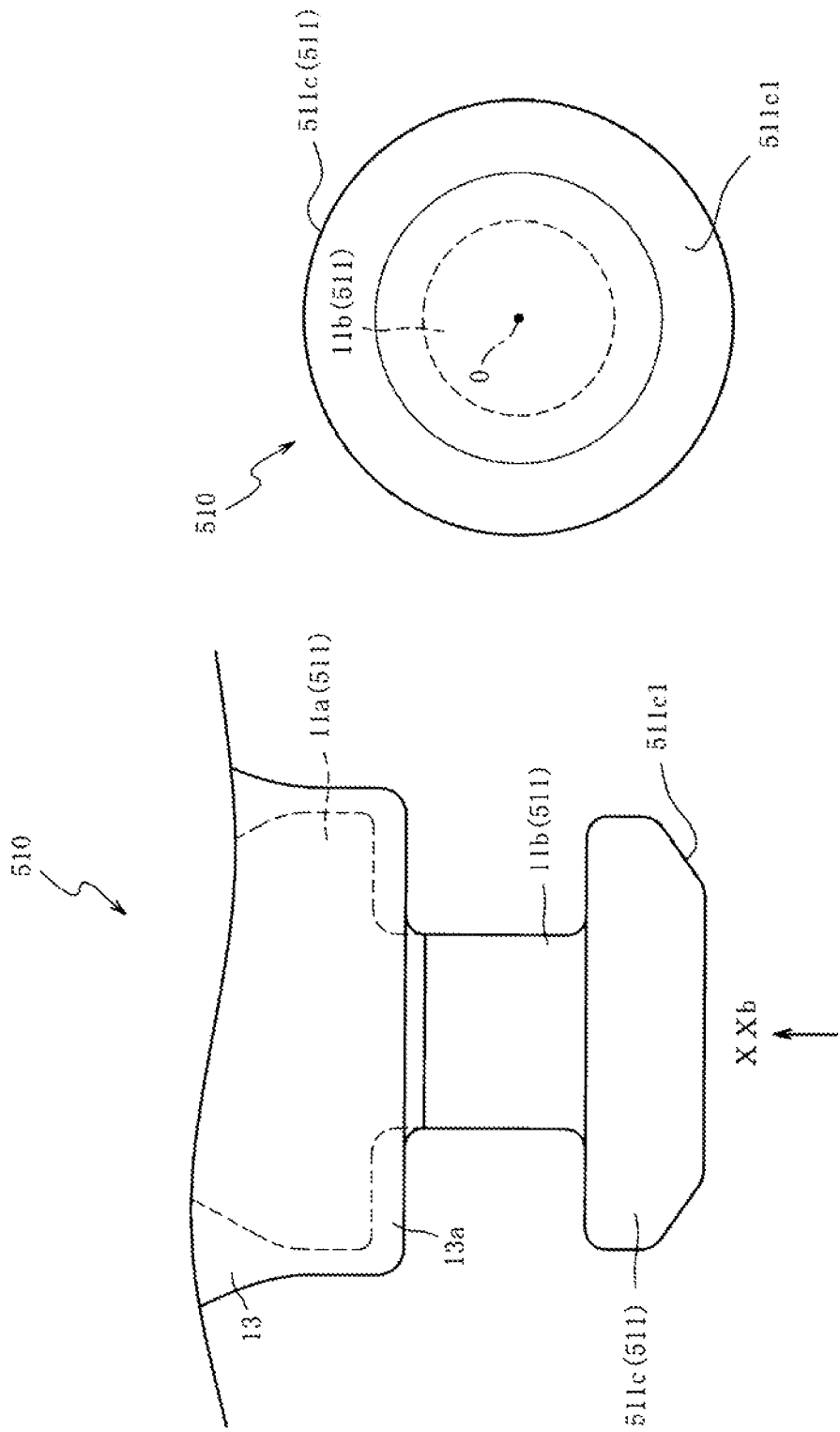

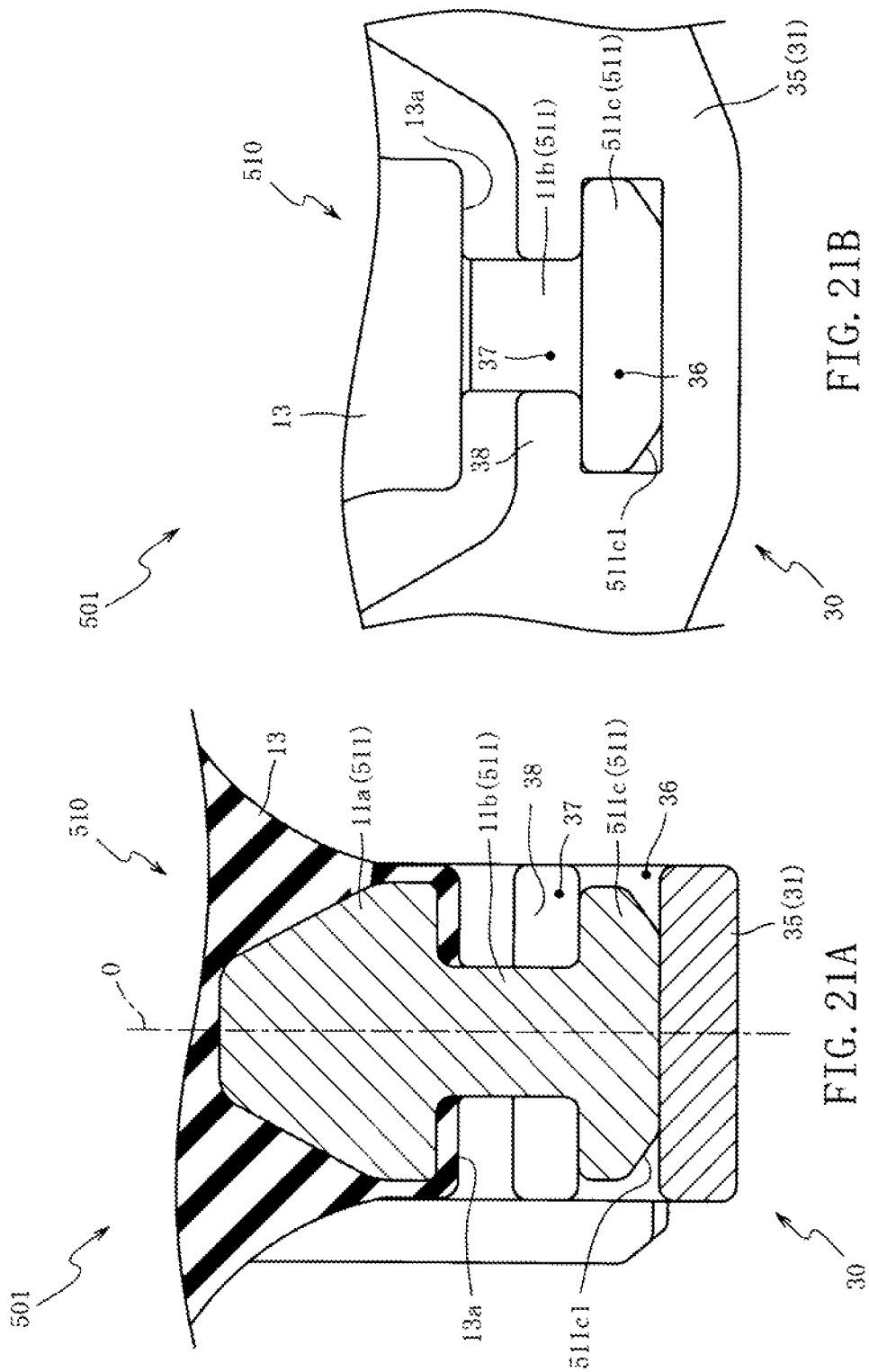

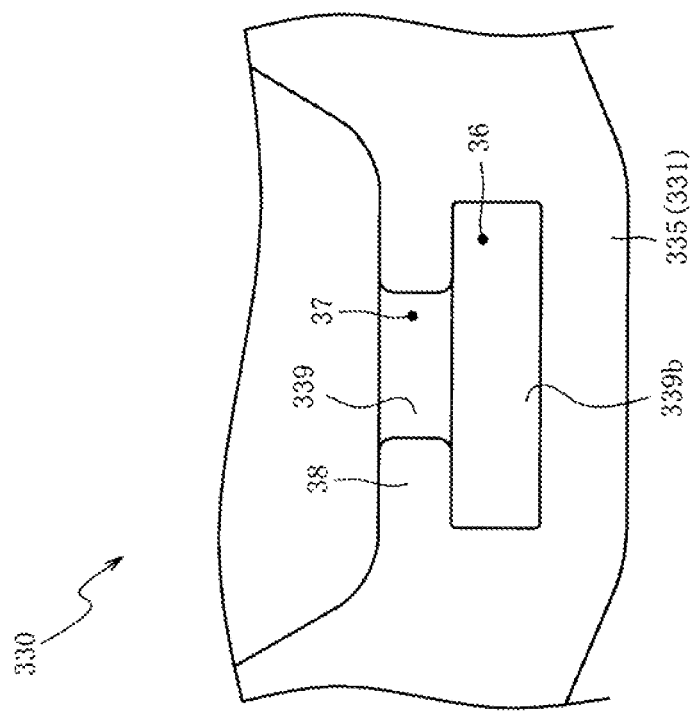
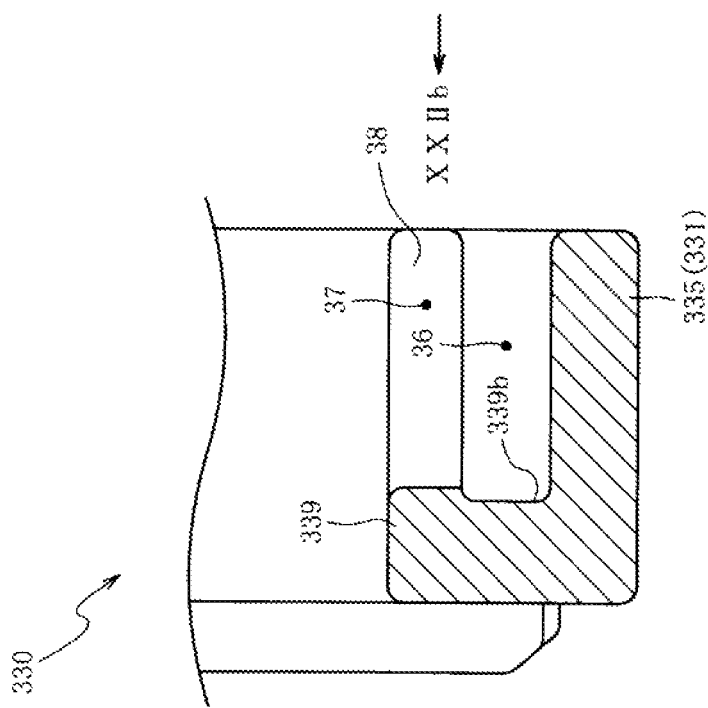

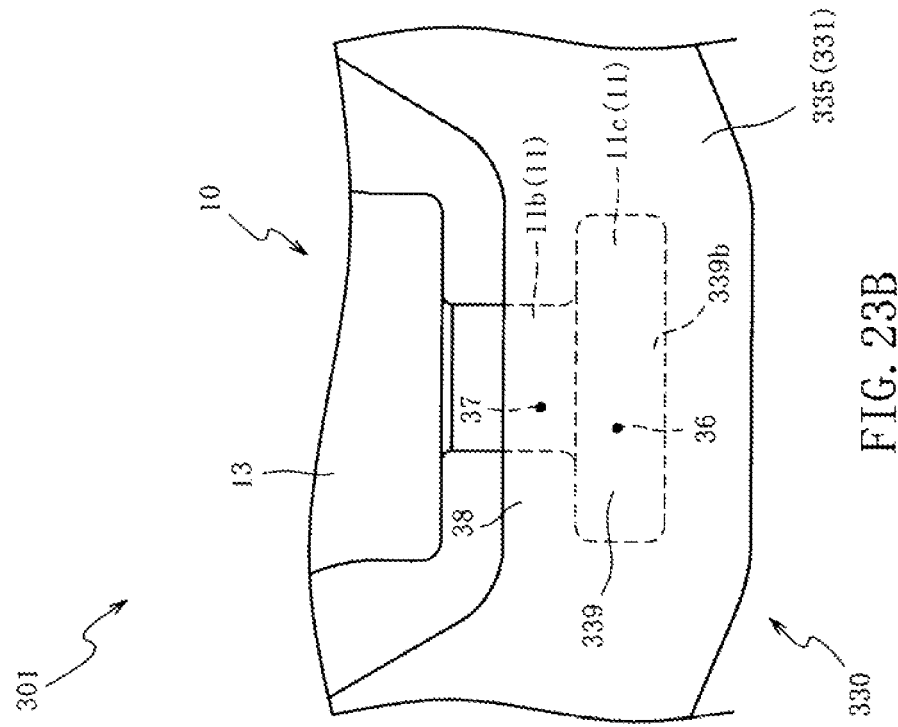
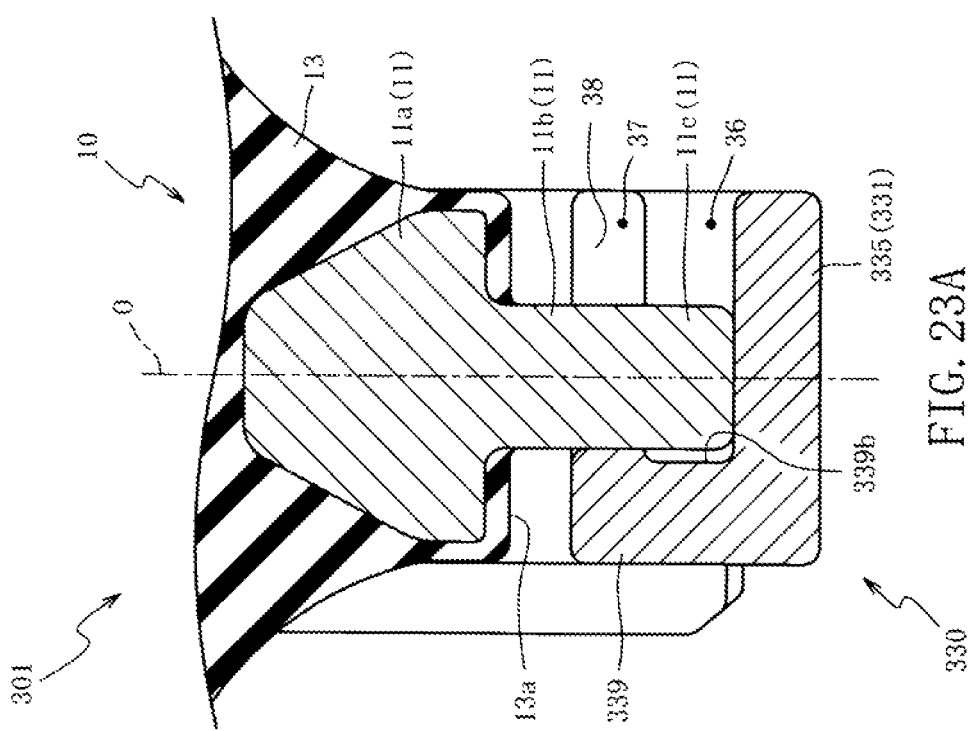
FIG. 23A
FIG. 23B

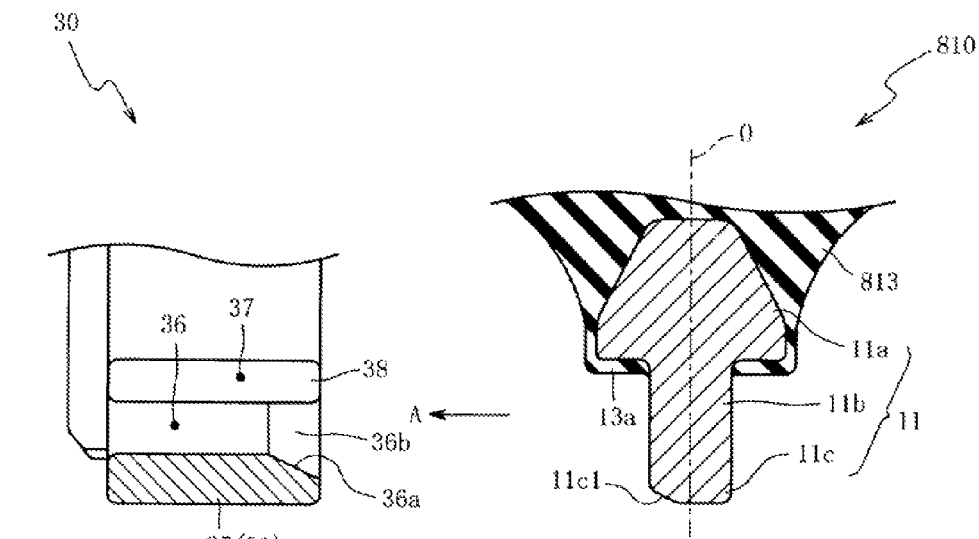
FIG. 26A
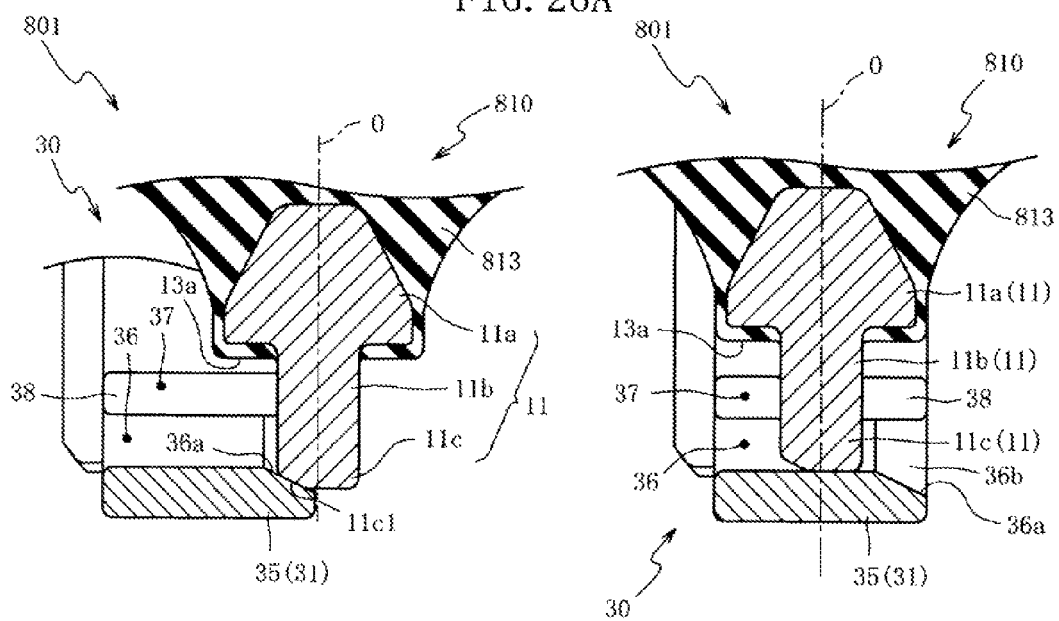
FIG. 26B
FIG. 26C

ANTI-VIBRATION UNIT

TECHNICAL FIELD

The present invention relates to an anti-vibration unit, and relates specifically to an anti-vibration unit which enables reduction in the number of parts and reduction in man-hours to be achieved during manufacturing.

BACKGROUND ART

Between a vehicle body of an automobile and an engine that is a vibration source, an anti-vibration device is arranged in order to suppress transmission of vibration to the vehicle body side. For example, in Patent Literature 1, an anti-vibration device (anti-vibration unit) of a so-called inverted type is disclosed in which, in an anti-vibration device body 18 (anti-vibration device) including a lower attaching tool 12 (boss member), an upper attaching tool 14 (outer tube member) of a tubular shape, and an anti-vibration base 16 formed of a rubber-like elastic body connecting both of these attaching tools 12, 14 to each other, the lower attaching tool 12 is attached to a vehicle body 1 side through a second bracket 22 of a frame shape in front view that surrounds the periphery thereof, and the upper attaching tool 14 is attached to an engine 2 side through a first bracket 20 that is extended toward the side.

CITATION LIST

Patent Literature

Patent Literature 1: Japanese Unexamined Patent Application Publication No. 2009-014080 (paragraph [0015], FIG. 1 to FIGS. 3 and the like)

SUMMARY OF INVENTION

Technical Problem

However, according to the technology of Patent Literature 1 described above, the structure is such that a female threaded section 24 is recessively arranged in the lower surface of the lower attaching tool 12 and the lower attaching tool 12 is fixed to the second bracket 22 by screwing a bolt 80 that is inserted to a bolt insertion hole 78 of the second bracket 22 to the female threaded section 24 of the lower attaching tool 12. Therefore the bolt 80 is required, which increases the number of parts. Also, the man-hours during manufacturing are increased because it is necessary to form the female threaded section 24 in the lower attaching tool 12. Further, when chemically treating the lower attaching tool 12, it is necessary to protect the female threaded section 24 with a masking bolt, and the attaching and detaching work of the masking bolt increases the man-hours during manufacturing.

The present invention has been developed in order to address the problems described above, and its object is to provide an anti-vibration unit which enables reduction in the number of parts and reduction in man-hours to be achieved during manufacturing.

Solution to Problem and Advantageous Effects of Invention

According to the anti-vibration unit described in claim 1, a press-in section formed in a boss member of an anti-vibration device is pressed in to a press-fitting section formed in a fixing member of a second bracket, and the boss member of an anti-vibration device is thereby fixed (press-in-fixed) to the fixing member of the second bracket. Thus, compared to the situation in which the boss member of the anti-vibration device is fixed (fastened) to the fixing member of the second bracket with a bolt, the bolt is unnecessary, enabling corresponding reduction in the number of parts. Moreover, by omitting the bolt in this way, it is not necessary to form a female threaded section on the boss member of the anti-vibration device, enabling corresponding reduction in man-hours during manufacturing. In addition, when chemically treating the boss member of the anti-vibration device, it is not necessary to implement a step of protecting the female threaded section with a masking bolt, thus the work of attaching and detaching the masking bolt is unnecessary, which in turn enables corresponding reduction in man-hours during manufacturing.

According to the anti-vibration unit described in claim 2, in addition to the effect exerted by the anti-vibration unit described in claim 1, the boss member of the anti-vibration device can be firmly fixed to the fixing member of the second bracket. It is because, in the press-in section of the boss member, an extension section is extended outward in the radial direction from a shaft section that projects from the lower surface side of the base section, whereas in the press-fitting section formed of the fixing member, an extension section press-fitting space and a shaft section press-fitting space are formed as spaces having a cross-sectional shape corresponding to the external shape of the extension section of the press-in section of the boss member and the shaft section, and the press-in section of the boss member is pressed in to the press-fitting section of the fixing member through an opening in the side surface of the fixing member along the direction orthogonal to the axis of the anti-vibration device.

That is, according to claim 2, when the first bracket is relatively displaced with respect to the second bracket in the axial direction of the anti-vibration device, the extension section in the press-in section of the boss member engages with the inner wall surface of the space in the press-fitting section of the fixing member, and thereby a state the boss member of the anti-vibration device is fixed to the fixing member of the second bracket can be maintained. The same is true when relative displacement to the prying direction (the direction of inclining the axis of the anti-vibration device) is combined thereto.

On the other hand, according to claim 2, even when the first bracket is relatively displaced with respect to the second bracket in the direction orthogonal to the axis of the anti-vibration device and the direction parallel to the press-in direction (that is, even when the outer tube member is displaced by the first bracket on a parallel with the opposite direction of the press-in direction of the boss member), a force in the direction of inclining the extension section is also generated in the boss member by elastic deformation of an anti-vibration base, because the anti-vibration base is interposed between the outer tube member and the boss member, and thereby the extension section in the press-in section of the boss member engages with the inner wall surface of the space in the press-fitting section of the fixing member. Thus, the press-in section of the boss member can be prevented from slipping off from the press-fitting section of the fixing member. As a result, a state the boss member of the anti-vibration device is fixed to the fixing member of the second bracket can be maintained.

According to the anti-vibration unit described in claim 3, in addition to the effect exerted by the anti-vibration unit described in claim 2, the press-fitting section of the fixing member includes a positioning wall formed at the final end that is on the opposite side of the opening in the side surface of the fixing member. Thus, pressing-in can be restricted by abutment of the press-in section of the boss member upon the positioning wall when the press-in section of the boss member is pressed in through the opening in the side surface of the fixing member. That is, the press-in position can be positioned by pressing in the press-in section of the boss member until abutting upon the positioning wall, therefore the press-in process can be simplified, the control cost thereof can be reduced, the press-in position is prevented from being dispersed, and the positional accuracy of the press-in position can be improved.

Also, in the product state, a state the press-in section of the boss member abuts upon the positioning wall in the press-fitting section of the fixing member is achieved. Therefore, when the first bracket is relatively displaced with respect to the second bracket, the input load can be counteracted utilizing engagement of the press-in section and the positioning wall with each other. Thus, a state the boss member is fixed to the fixing member can be securely maintained.

Also, "the distal end that is on the opposite side of the opening in the side surface of the fixing member" means the distal end in the press-in direction in pressing in the boss member (that is the position where the boss member is in finally pressed). It is not required that the positioning wall is positioned at the end in the width direction (the press-in direction) of the fixing member.

According to the anti-vibration unit described in claim 4, in addition to the effect exerted by the anti-vibration unit described in claim 3, the engagement area of the press-fitting section with the inner wall surface in the extension section press-fitting space can be enlarged because the extension section of the boss member is formed into a disk shape. Thus, utilizing engagement of the extension section with the inner wall surface of the extension section press-fitting space, a state the boss member is fixed to the fixing member of the second bracket can be more securely maintained.

Also, in the product state, the input load can be counteracted utilizing engagement of the extension section and the positioning wall with each other because the positioning wall is formed so as to curve in an arc shape corresponding to the disk shape of the extension section. Thus, a state the boss member is fixed to the fixing member can be securely maintained.

In this case, the width dimension of the press-fitting section is prevented from increasing while enabling positioning of the press-in position of the boss member, and the second bracket can be miniaturized because the positioning wall is formed so as to curve in an arc shape. Also, when the extension section of the boss member is formed into a square plate shape for example, it is necessary to reduce the plate thickness of the entire positioning wall in order to suppress the width dimension (the dimension in the press-in direction) of the press-fitting section. In claim 4, however, the plate thickness in both ends of the positioning wall can be made thick and stiffness of the positioning wall can be secured because the positioning wall is formed so as to curve in an arc shape.

According to the anti-vibration unit described in claim 5, in addition to the effect exerted by the anti-vibration unit described in claim 4, the positioning wall includes an opening formed so as to open in the center part in the width direction, allowing the scraping chips can be discharged to the outside through the opening when scraping chips are formed in pressing in the boss member to the press-fitting section. Thus, the scraping chips are not caught, the extension section of the boss member can be tightly attached to the positioning wall, and therefore the positional accuracy of the press-in position of the boss member can be secured.

Here, the plate thickness in the center part in the width direction becomes thin because the positioning wall is formed so as to curve in an arc shape. In this case, unless the opening is arranged, it is necessary to increase the plate thickness of the positioning wall (the center part in the width direction) in order to secure the strength (to prevent breakage) of the center part in the width direction when the press-in position of the boss member is restricted, and the size of the second bracket (the fixing member) is increased correspondingly. On the other hand, in claim 5, the second bracket (the fixing member) can be miniaturized while securing the strength of the positioning wall (while preventing the breakage of the center part in the width direction) because the opening is formed in the center in the width direction of the positioning wall.

According to the anti-vibration unit described in claim 6, in addition to the effect exerted by the anti-vibration unit described in claim 4 or 5, it is not necessary to consider the orientation in the peripheral direction because the boss member is formed into an axially symmetric shape and is disposed so as to be coaxial with the axis of the anti-vibration device. Thus, when the boss member is to be arranged inside the vulcanizing mold in vulcanizing molding of the anti-vibration base, the work can be executed without considering the orientation around the axis of the boss member in arranging the boss member. Similarly, when the outer tube member of the anti-vibration device is to be pressed in to the first bracket and is to be held, the work can be executed without considering the orientation around the axis of the anti-vibration device in pressing in the outer tube member. That is, the work of positioning the boss member or the anti-vibration device in the peripheral direction can be omitted, and the man-hours during manufacturing can be reduced correspondingly.

According to the anti-vibration unit described in claim 7, in addition to the effect exerted by the anti-vibration unit described in any of claims 3 to 6, the positioning wall is recessively arranged in the surface on the side upon which the press-in section of the boss member abuts and includes a groove section extended in a groove shape along at least a part of the outer periphery that continues to the inner wall surface side of the press-fitting section. Therefore the scraping chips can be stored in the groove section when scraping chips are generated at the time the press-in section of the boss member is pressed in to the press-fitting section of the fixing member. That is, when the scraping chips are caught between the press-in section of the boss member and the positioning wall, the press-in position of the press-in section of the boss member is dispersed, while, according to claim 7, the positional accuracy of the press-in position of the boss member can be secured because the scraping chips can be stored in the groove section and the press-in section of the boss member can be tightly attached to the positioning wall.

BRIEF DESCRIPTION OF DRAWINGS

FIG. 3 (a) is a partially enlarged front view of the anti-vibration device, and (b) is a cross-sectional view of the boss member taken from the line IIIb-IIIb of FIG. 3(a).

FIG. 5 (a) is a front view of the second bracket, and (b) is a cross-sectional view of the second bracket 30 taken from the line Vb-Vb of FIG. 5 (a).

FIG. 6 (a) is a partially enlarged cross-sectional view of the anti-vibration unit before pressing-in, and (b) and (c) are a partially enlarged cross-sectional view and a partially enlarged front view of the anti-vibration unit after pressing-in.

FIG. 8 (a) is a partially enlarged cross-sectional view of the anti-vibration unit before pressing-in, (b) and (c) are a partially enlarged cross-sectional view and a partially enlarged front view of the anti-vibration unit after pressing-in.

FIG. 9 (a) is a partially enlarged cross-sectional view of a second bracket in the third embodiment, and (b) is a partially enlarged rear view of the second bracket as viewed from the direction of the arrow IXb of FIG. 9(a).

FIG. 10 (a) is a partially enlarged cross-sectional view of the anti-vibration unit after pressing-in, and (b) is a partially enlarged front view of the anti-vibration unit after pressing-in.

FIG. 11 (a) is a partially enlarged cross-sectional view of an anti-vibration unit after pressing-in in the fourth embodiment, and (b) is a partially enlarged front view of the anti-vibration unit after pressing-in.

FIG. 12 (a) is a partially enlarged front view of an anti-vibration device in the fifth embodiment, and (b) is a cross-sectional view of a boss member taken from the line XIIb-XIIb of FIG. 12(a).

FIG. 13 (a) is a partially enlarged cross-sectional view of the anti-vibration unit after pressing-in, and (b) is a partially enlarged front view of the anti-vibration unit after pressing-in.

FIG. 16 (a) is a partially enlarged front view of an anti-vibration device in the seventh embodiment, and (b) is a cross-sectional view of a boss member taken from the line XVIb-XVIb of FIG. 16(a).

FIG. 18 (a) is a partially enlarged front view of the anti-vibration unit after pressing-in, and (b) is a partially enlarged cross-sectional view of the anti-vibration unit taken from the line XVIIIb-XVIIIb of FIG. 18(a).

FIG. 20 (a) is a partially enlarged front view of the anti-vibration device in the modification, and (b) is a bottom view of the boss member as viewed in the direction of the arrow XXb of FIG. 20(a).

FIG. 21 (a) is a partially enlarged cross-sectional view of the anti-vibration unit after pressing-in, and (b) is a partially enlarged front view of the anti-vibration unit 501 after pressing-in.

FIG. 22 (a) is a partially enlarged cross-sectional view of the second bracket in the modification, and (b) is a partially enlarged rear view of the second bracket as viewed from the direction of the arrow XXIIb of FIG. 22(a).

FIG. 23 (a) is a partially enlarged cross-sectional view of the anti-vibration unit after pressing-in, and (b) is a partially enlarged front view of the anti-vibration unit after pressing-in.

FIG. 25 (a) is a partially enlarged cross-sectional view of the anti-vibration unit after pressing-in, and (b) is a partially enlarged front view of the anti-vibration unit after pressing-in.

FIG. 26 FIG. 26 is cross-sectional view showing the process of pressing-in of the anti-vibration unit in the modification, (a) corresponds to a state before pressing-in, (b) corresponds to a state in the middle of pressing-in, and (c) corresponds to a state after pressing-in respectively.

DESCRIPTION OF EMBODIMENTS

Figure 1:
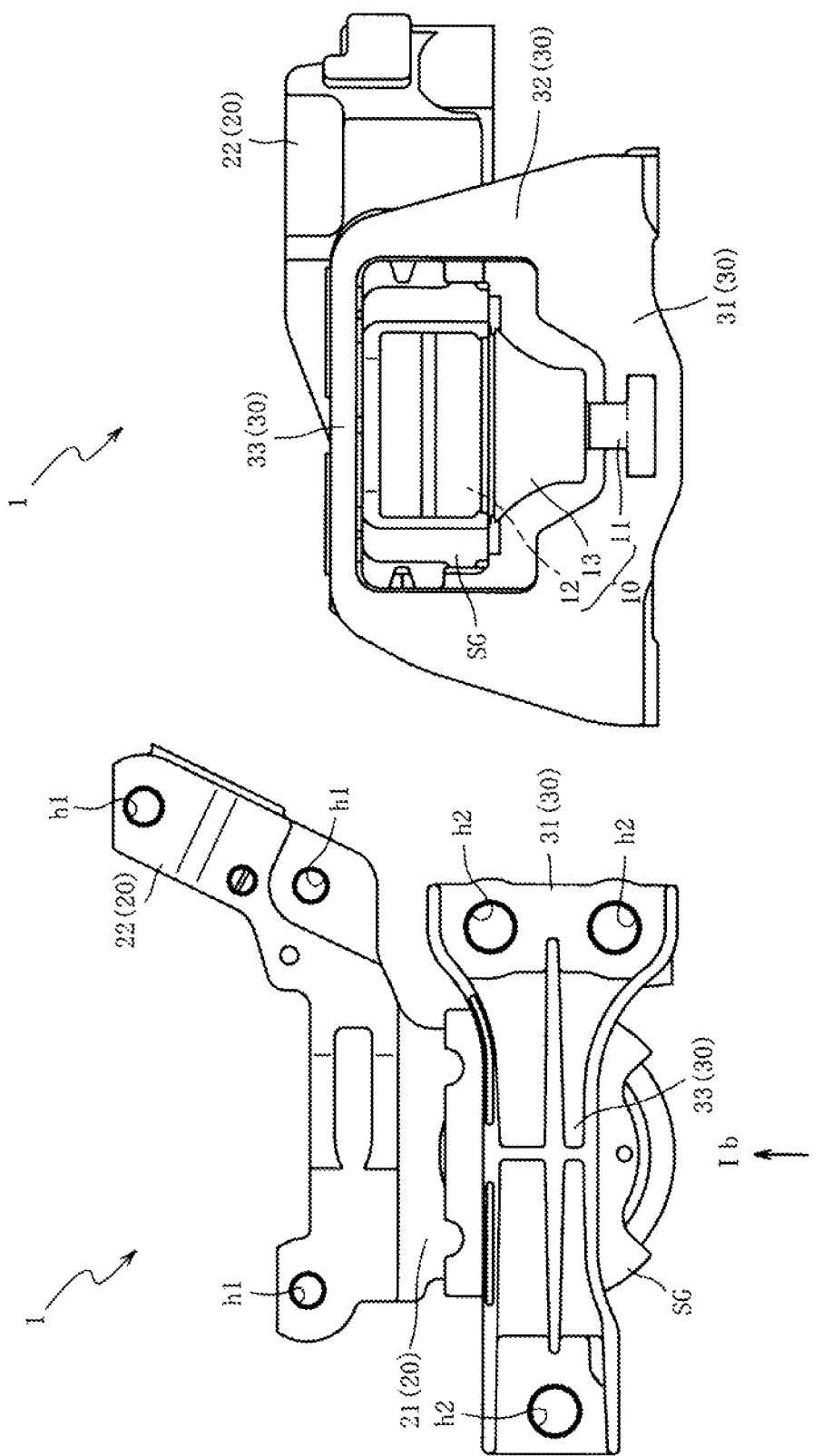
FIG. 1 (a) is a top view of an anti-vibration unit in a first embodiment of the present invention, and (b) is a front view of the anti-vibration unit as viewed in the direction of an arrow Ib of FIG. 1(a).

Hereinafter, preferred embodiments of the present invention will be described referring to the attached drawings. FIG. 1(a) is a top view of an anti-vibration unit 1 in a first embodiment of the present invention, and FIG. 1(b) is a front view of the anti-vibration unit 1 as viewed in the direction of an arrow Ib of FIG. 1(a).

The anti-vibration unit 1 is a device for not transmitting vibration of an engine of an automobile to a vehicle body (not illustrated) while supporting and fixing the engine (not illustrated). The anti-vibration unit 1 includes an anti-vibration device 10 in which a boss member 11 and an outer tube member 12 are connected with each other by an anti-vibration base 13 formed of a rubber-like elastic body (refer to FIG. 3 with respect to all of them), a first bracket 20 holding the outer tube member 13 of the anti-vibration device 10 and attached to the engine side, and a second bracket 30 fixed with the boss member 11 of the anti-vibration device 10 and attached to the vehicle body side.

The anti-vibration device 10 is disposed in a vertical attitude in which the axial direction agrees to the vertical direction and is disposed in an inverted state with the boss member 11 side coming to the downward side, and the periphery thereof is surrounded by the second bracket 30. The first bracket 20 is extended horizontally toward the outside in the radial direction (the direction orthogonal to the axis; upward in FIG. 1(a)) from the side of the anti-vibration device 10.

Also, in the first bracket 20 and the second bracket 30, attaching holes h1, h2 are bored at three positions respectively, and the first bracket 20 and the second bracket 30 are fastened and fixed to the engine side and the vehicle body side by bolts that are inserted to these respective attaching holes h1, h2. Further, a stopper rubber SG is furnished on the anti-vibration device 10 and the first bracket 20, and the upper surface side of the anti-vibration device 10 and the outer periphery side of a body section 21 (refer to FIG. 4) of the first bracket 20 are covered by the stopper rubber SG.

Also, in a state where the anti-vibration unit 1 supports and fixes the engine of the automobile to the vehicle body (so-called 1 W state), the anti-vibration base 13 is compressed and deformed by the weight of the engine, and a predetermined gap is formed correspondingly between the upper end side of the anti-vibration device 10 and a connection member 33 of the second bracket 30.

Next, referring to FIG. 2 to FIG. 5, the anti-vibration device 10, the first bracket 20 and the second bracket 30 forming the anti-vibration unit 1 will be described respectively.

Figure 2:
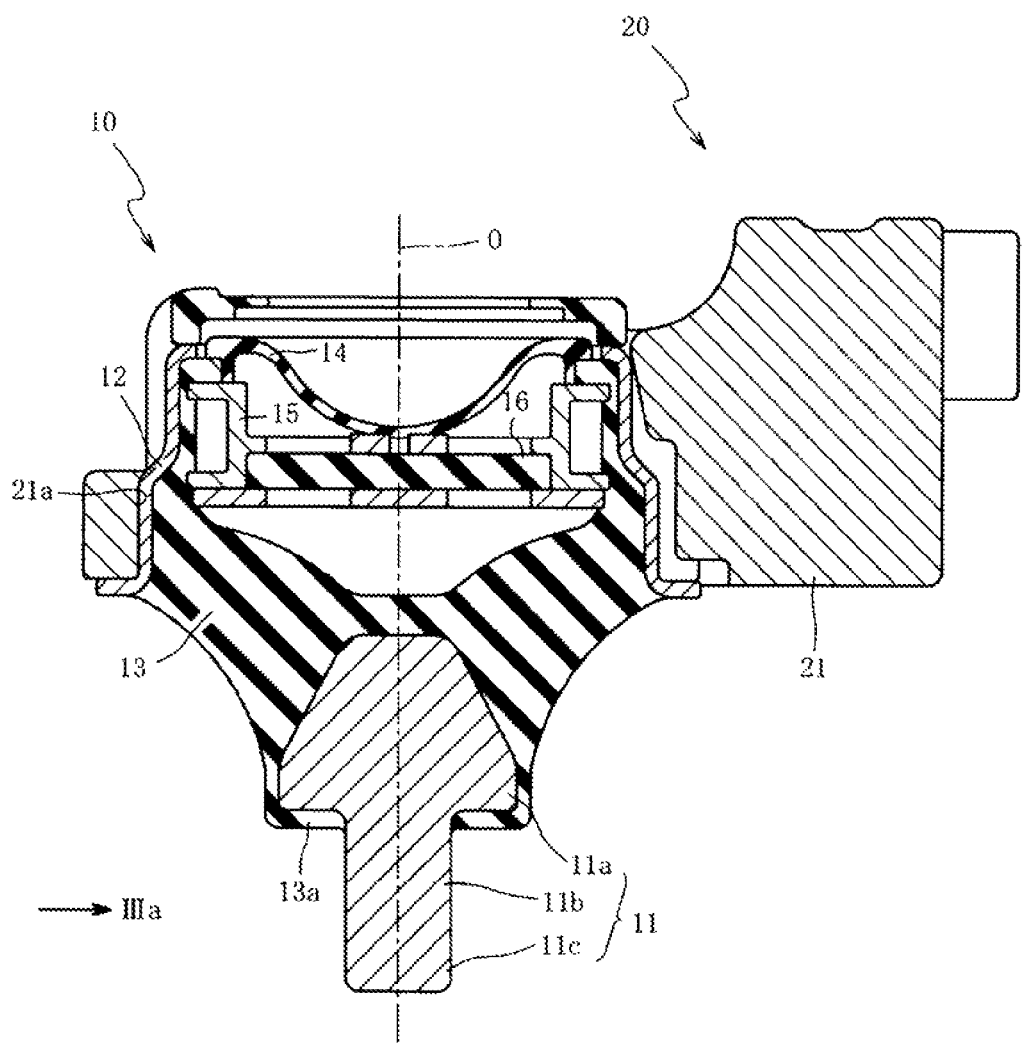
FIG. 2 is a cross-sectional side view of the anti-vibration device.

FIG. 2 is a cross-sectional side view of the anti-vibration device 10, and corresponds to the vertical cross section when cut by a plane including the axis O. Also, in FIG. 2, a state where the anti-vibration device 10 is held by the first bracket 20 is illustrated. The cross section of the first bracket 20 in this FIG. 2 corresponds to the cross section taken from a line II-II of FIG. 4.

As shown in FIG. 2, the anti-vibration device 10 mainly includes the boss member 11 attached to the vehicle body side through the second bracket 30 (refer to FIG. 1), the outer tube member 12 of a tubular shape attached to the engine side through the first bracket 20, and the anti-vibration base 13 connecting both of these members 11, 12 to each other and formed of a rubber-like elastic body.

The boss member 11 includes a base section 11a formed into a generally truncated cone shape cross section narrowing upward, a shaft section 11b projecting downward (the lower side in FIG. 2) from the base section 11a, and an extension section 11c (refer to FIG. 3) extending outward in the radial direction from the projection distal end of the shaft section 11b, and is integrally formed of an aluminum alloy. The base section 11a and the shaft section 11b are formed so as to be symmetric around the axis O. Also, the detailed configuration of the boss member 11 will be described below referring to FIG. 3.

The outer tube member 12 is formed of an iron and steel material into a tubular shape with the upper and lower ends (the upper side and the lower side in FIG. 2) being opened, and is disposed above (the upper side in FIG. 2) the boss member 11 in a coaxial manner. Also, the outer tube member 12 is configured to have a step with a tubular part of a large diameter disposed on the lower side (the lower side in FIG. 2) of the step and a tubular part of a small diameter disposed on the upper side (the upper side in FIG. 2) of the step respectively, and the tubular part of a large diameter is pressed and held in the axial direction to the first bracket 20.

The anti-vibration base 13 is formed of a rubber-like elastic body into a generally truncated cone shape cross section narrowing downward symmetric around the axis O, and is vulcanizingly adhered between the outer surface in the base section 11a of the boss member 11 and the inner wall surface of the outer tube member 12.

Inside the outer tube member 12, a diaphragm 14, a partition member 15, and an elastic partition membrane 16 are disposed. The diaphragm 14 is formed from a rubber-like elastic body into a rubber membrane shape having a partial sphere shape, and is furnished on the upper end side (the upper side in FIG. 2) of the outer tube member 12 in a tightly attached (watertight) state. As a result, a liquid enclosure chamber where liquid is enclosed is formed between the lower surface side of the diaphragm 14 and the upper surface side of the anti-vibration base 13.

In the liquid enclosure chamber, an antifreeze liquid (not illustrated) such as ethylene glycol and the like is enclosed. The partition member 15 is a member that partitions the liquid enclosure chamber into a first liquid chamber on the anti-vibration base 13 side and a second liquid chamber on the diaphragm side, and, on the outer periphery side thereof, an orifice flow passage that makes the first liquid chamber and the second liquid chamber communicate with each other is formed. Also, in the center of the partition member 15, a pair of opposing walls where plural openings are formed respectively is arranged so as to oppose each other, and the elastic partition membrane 16 formed of a rubber-like elastic body into a disk shape is stored between the opposing walls.

Further, by invertingly arranging the anti-vibration device 10, attaching the boss member 11 on the vehicle body side, and attaching the outer tube member 12 on the engine side as the present embodiment, a part of the vibration transmission route from the partition member 15 to the vehicle body side can be formed by the anti-vibration base 13. Thus, when the elastic partition membrane 16 collides on the opposition walls of the partition member 15 and the restriction plate vibrates, the vibration can be surely prevented from being transmitted to the vehicle body side by the vibration insulation effect of the anti-vibration base 13 that constitutes a part of the vibration transmission route, and generation of noise can be reduced.

Next, detailed configuration of the boss member 11 will be described referring to FIG. 3. FIG. 3(a) is a partially enlarged front view of the anti-vibration device 10, and FIG. 3(b) is a cross-sectional view of the boss member 11 taken from the line IIIb-IIIb of FIG. 3(a). FIG. 3(a) corresponds to the front view of the anti-vibration device 10 as viewed along the direction of the arrow IIIa of FIG. 2.

As shown in FIG. 3, with respect to the boss member 11, the shaft section 11b projects downward from the base section 11a, the extension section 11c is formed so as to extend from the projection distal end of the shaft section 11b outward in the radial direction (the direction orthogonal to the axis O), and a part of the shaft section 11b and the extension section 11c are made to be the press-in section that is pressed in to the press-fitting section 35 of the second bracket 30.

The shaft section 11b is formed as a shaft-like body with a circular cross section symmetric around the axis O, and, with respect to the extension section 11c, a pair of flat plate shapes whose thickness dimension (the dimension in the vertical direction in FIG. 3(a)) is constant and whose width dimension (the dimension in the vertical direction in FIG. 3(b)) is equal to the diameter of the shaft section 11b is extended toward the directions opposite to each other with respect to the shaft section 11b in between. Thus, in the front view shown in FIG. 3(a), the press-in section (the shaft section 11b and the extension section 11c) of the boss member 11 becomes a generally T-shape.

A rubber membrane 13a covering the outer wall surface of the boss member 11 continues to the anti-vibration base 13. This rubber membrane 13a covers only the outer wall surface (the outer peripheral surface and the lower surface) of the base section 11a, and does not cover the outer wall surface of the shaft section 11b and the outer wall surface of the extension section 11c. That is, the shaft section 11b and the extension section 11c are formed so that the outer wall surfaces thereof are exposed.

Figure 4:
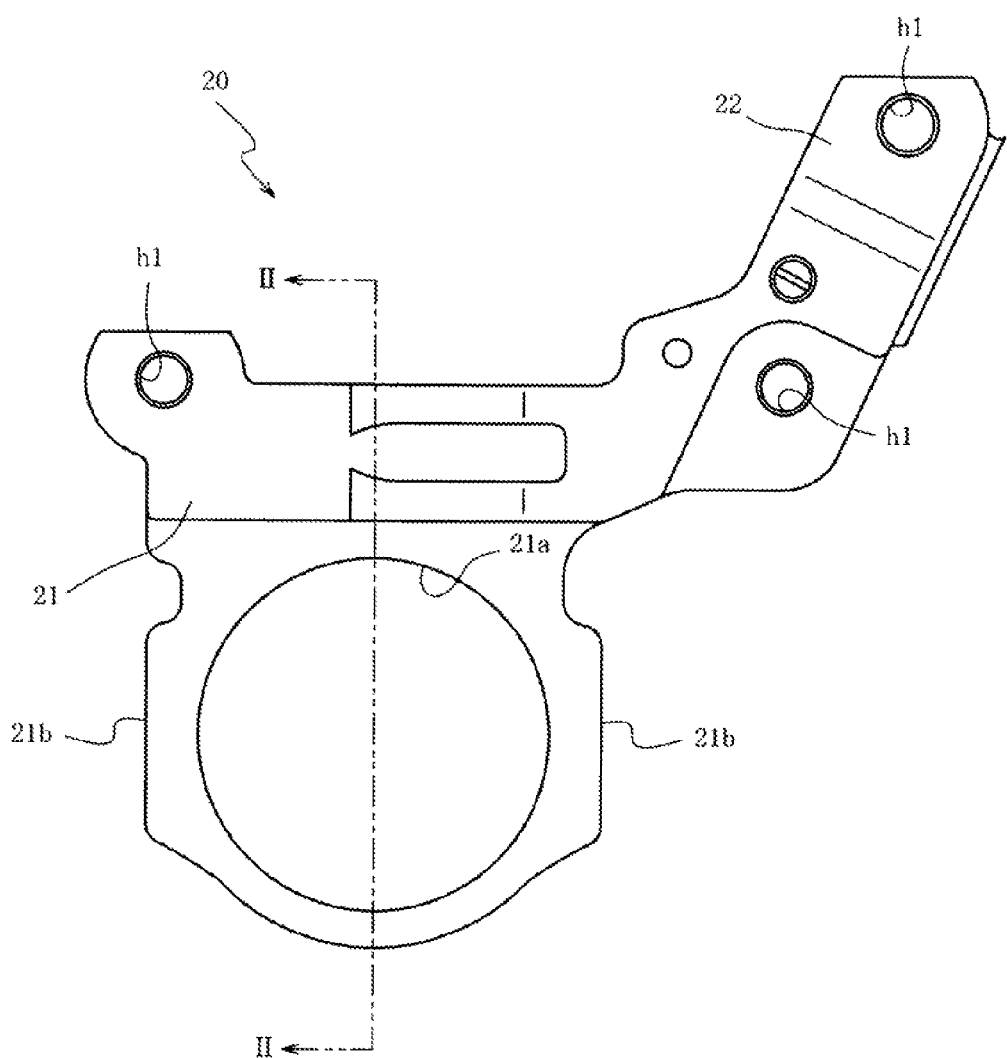
FIG. 4 is a top view of the first bracket.

Next, the first bracket 20 will be described referring to FIG. 4. FIG. 4 is a top view of the first bracket 20. The perpendicular direction of the paper surface of FIG. 4 corresponds to the press-in direction of the anti-vibration device 10 (that is, the axis O direction after pressing-in; refer to FIG. 2).

As shown in FIG. 4, the first bracket 20 mainly includes the body section 21 of a flat plate shape, and a block-like extended section 22 that is extended diagonally from the corner on one side (the right side in FIG. 4) of the body section 21. At the corner on the other side (the left side in FIG. 4) of the body section 21 and both sides of the extended section 22, the attaching holes h1 described above are bored respectively. By screwing the bolts that are inserted to the attaching holes h1 to the engine side, the first bracket 20 is fastened and fixed to the engine side with the lower surface side (the back side in FIG. 4) as the attaching surface.

Below the body section 21, a press-in hole 21a of a circular shape in the top view is bored. To this press-in hole 21a, the outer tube member 12 of the anti-vibration device 10 is pressed in the axis O direction, and thereby the anti-vibration device 10 (the outer tube member 12) is held by the first bracket 20 (refer to FIG. 1 and FIG. 2). Also, on both side surfaces (the right side and the left side in FIG. 4) of the body section 21, stopper surfaces 21b formed as flat surfaces are formed. At the time of inputting large displacement, the stopper orthogonal effect is exerted by abutment of the stopper surfaces 21b upon erection members 32 of the second bracket 30 through the stopper rubber SG (refer to FIG. 1) that is furnished on the anti-vibration device 10.

Next, the second bracket 30 will be described referring to FIG. 5. FIG. 5(a) is a front view of the second bracket 30, and FIG. 5(b) is a cross-sectional view of the second bracket 30 taken from the line Vb-Vb of FIG. 5(a). Also, in FIG. 5(a), a part of a fixing member 31 and the erection member 32 is illustrated in a partial cross-sectional view.

The second bracket 30 is a member interposed between the anti-vibration device 10 and the vehicle body side. The second bracket 30 includes the fixing member 31 to which the boss member 11 (refer to FIG. 3) of the anti-vibration device 10 is fixed, the pair of erection members 32 erected upward from both sides (the left side and the right side in FIG. 5(a)) of the fixing member 31 and disposed so as to oppose each other with the anti-vibration device 10 in between, and the connection member 33 connecting erection distal ends of the pair of erection members 32 each other and disposed so as to oppose the fixing member 31 with the anti-vibration device 10 in between. These respective members 31 to 33 are integrally formed of an aluminum alloy into a frame shape in a front view.

Also, the opposing surfaces (the inner wall surfaces) of the erection members 32 are formed as flat surfaces disposed in parallel so as to oppose each other at a predetermined interval, the lower surface (the inner wall surface) of the connection member 33 is formed as a flat surface that is vertical to the inner wall surfaces of the erection members 32 (that is, vertical to the axis of the anti-vibration device 10), and these inner wall surfaces function as stopper surfaces that receive the anti-vibration device 10 or the first bracket 20 at the time large displacement is inputted and restrict the displacement.

The fixing member 31 includes fastened sections 34 and a press-fitting section 35, and these both sections 34, 35 are formed integrally. The fastened sections 34 are portions attached on the vehicle body side, and are formed on both ends (the left side and the right side in FIG. 5(a)) of the fixing member 31. The fastened sections 34 are formed into a plate shape, bored with the attaching holes h2 described above in the plate thickness direction (the vertical direction in FIG. 5(a)), and fastened and fixed to the vehicle body side with the lower surface side (the lower side in FIG. 5(a)) as the attaching surface by screwing the bolts that are inserted to the attaching holes h2 to the vehicle body side.

The press-fitting section 35 is positioned between both of the fastened sections 34, is a portion to which the boss member 11 (refer to FIG. 3) of the anti-vibration device 10 is pressed in, and includes an extension section press-fitting space 36 and a shaft section press-fitting space 37. The extension section press-fitting space 36 is a space where the extension section 11c (refer to FIG. 3) in the boss member 11 of the anti-vibration device 10 is pressed in, is formed into a cross-sectional shape corresponding to the external shape of the extension section 11c pressed in, and includes openings in the side surfaces on both sides (the front side and the back side of the paper surface in FIG. 5(a)) of the press-fitting section 35.

That is, with respect to the extension section press-fitting space 36, the shape in the front view shown in FIG. 5(a) (that is, as viewed in the press-in direction described below) is made into a shape similar to the shape in the front view (as viewed in the press-in direction) of the extension section 11c in the boss member 11 of the anti-vibration device 10 (refer to FIG. 3(a)), and the shape in the front view of the extension section press-fitting space 36 is made smaller than the shape in the front view in the extension section 11c. Thus, the allowance for pressing-in at the time of pressing-in is secured.

The shaft section press-fitting space 37 is formed as a space with a cross-sectional shape through which at least the shaft section 11b (refer to FIG. 3) in the boss member 11 of the anti-vibration device 10 can pass, with the lower surface side of the space to communicate with the upper surface side of the extension section press-fitting space 36, and includes openings in the side surfaces on both sides (the front side and the back side of the paper surface in FIG. 5(a)) and the upper surface (the surface on the upper side in FIG. 5(a); the surface opposing the connection member 33) of the press-fitting section 35.

That is, with respect to the shaft section press-fitting space 37, the width dimension (the dimension in the right/left direction in FIG. 5(a)) in the front view (that is, as viewed in the press-in direction described below) shape shown in FIG. 5(a) is made generally equal to the diameter dimension of the shaft section 11b of the boss member 11, and is smaller than the width dimension (the dimension in the right/left direction in FIG. 5(a)) of the extension section press-fitting space 36. Thus, above the extension section press-fitting space 36 (the upper side in FIG. 5(a)), a plate-like restriction wall 38 that extends with the shaft section press-fitting space 37 in between is formed.

Also, the width dimension of the shape in the front view of the shaft section press-fitting space 37 may be larger than the diameter dimension of the shaft section 11b of the boss member 11 as far as it is smaller than the width dimension (the dimension in the right/left direction in FIG. 5(a)) of the extension section press-fitting space 36 (that is, as far as the restriction wall 38 can be formed). Alternatively the width dimension may be smaller than the diameter dimension of the shaft section 11b of the boss member 11 as far as the shaft section 11b can pass through in the press-in direction. Further, in the present embodiment, the shape in the front view (the cross-sectional shape when cut by an imaginary plane vertical to the press-in direction (the direction vertical to the paper surface in FIG. 5(a))) of the extension section press-fitting space 36 and the shaft section press-fitting space 37 is made into an equal cross-sectional shape along the press-in direction.

Figure 6A:
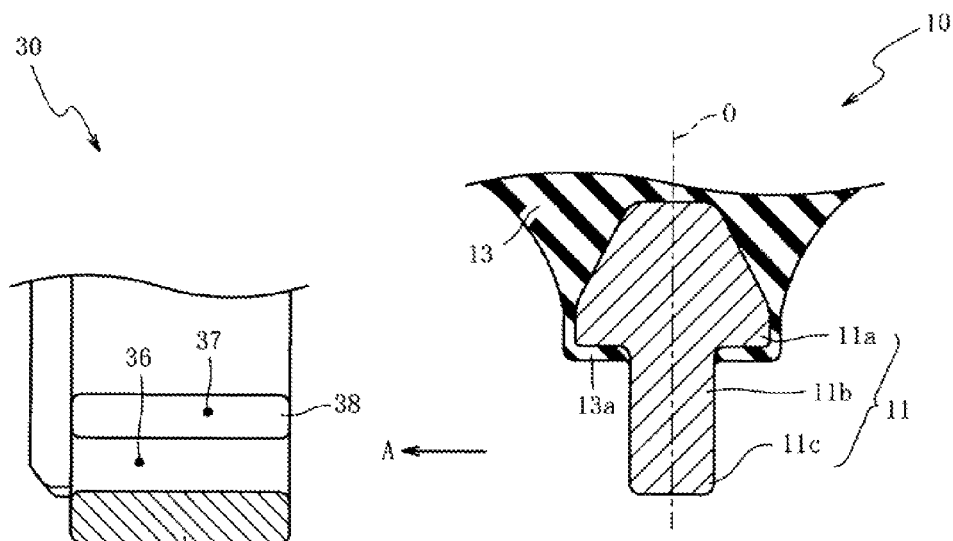
Figure 6B:
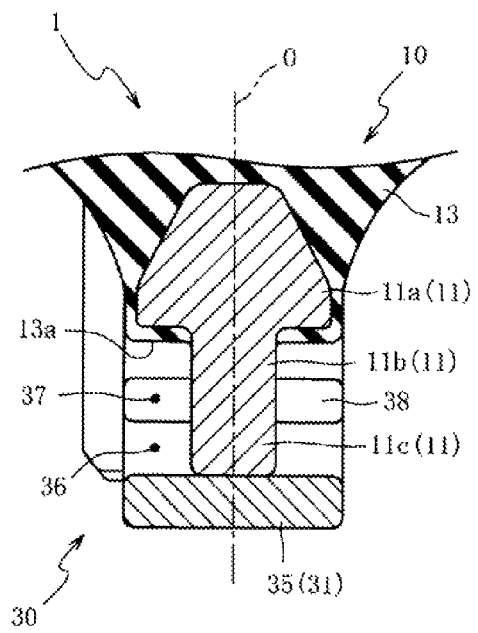
Figure 6C:
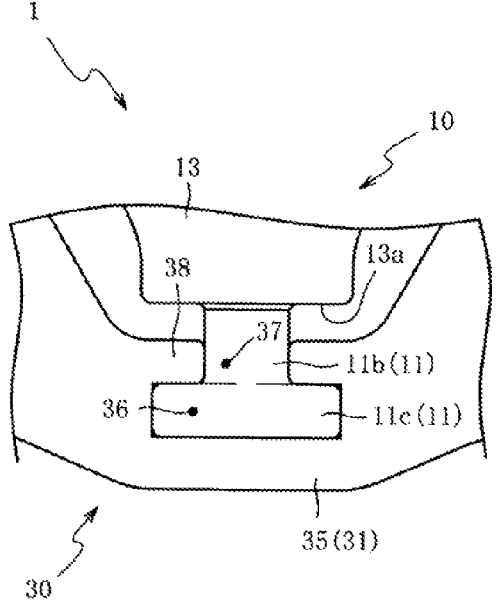

A manufacturing method of the anti-vibration unit that is configured as described above will be described referring to FIG. 6. FIG. 6(a) is a partially enlarged cross-sectional view of the anti-vibration unit 1 before pressing-in, and FIG. 6(b) and FIG. 6(c) are a partially enlarged cross-sectional view and a partially enlarged front view of the anti-vibration unit 1 after pressing-in. The cross section of the anti-vibration device 10 of FIG. 6(a) and FIG. 6(b) corresponds to the cross section of FIG. 2, and the cross section of the second bracket 30 of FIG. 6(a) and FIG. 6(b) corresponds to the cross section of FIG. 5(b).

In manufacturing the anti-vibration unit 1, the outer tube member 12 of the anti-vibration device 10 is pressed in to the press-in hole of the first bracket 20 in the axis O direction, and the outer tube member 12 of the anti-vibration device 10 is held by the first bracket 20 (the first bracket holding step; refer to FIG. 2). Next, after the stopper rubber SG is furnished from the upper end side (the upper side in FIG. 2) of the anti-vibration device 10, the boss member 11 (the press-in section) of the anti-vibration device 10 is pressed in to the fixing member 31 (the press-fitting section 35) of the second bracket 30, and the boss member 11 of the anti-vibration device 10 is fixed to the second bracket 30 (the second bracket fixing step; refer to FIG. 1(b)). Thus, manufacturing of the anti-vibration unit 1 is completed.

In assembling the anti-vibration device 10, first, the rubber-like elastic body is filled inside the vulcanizing mold where the boss member 11 and the outer tube member 12 have been arranged, and a molded body obtained by connecting the boss member 11 and the outer tube member 12 by the anti-vibration base 13 is vulcanizingly molded. Next, the partition member 15 and the diaphragm 14 are fitted to the molded body successively through the opening of the outer tube member 12, and the entire periphery section of the opening (the upper end of the tubular section of the small diameter) of the outer tube member 12 is subjected to diameter reduction work (drawing work) in the radial direction. Thus, assembling of the anti-vibration device 10 is completed (the anti-vibration device forming step). The partition member 15 is fitted to the molded body with the elastic partition membrane 16 stored between the pair of opposing walls thereof.

As shown in FIG. 6(a), in fixing (pressing-in) of the boss member 11 of the anti-vibration device 10 and the fixing member 31 of the second bracket 30, the second bracket 30 is fixed to a table (not illustrated) of the press-in device, and the boss member 11 of the anti-vibration device 10 is held by a holding arm (not illustrated) of the press-in device and is disposed at a pressing-in possible position (that is, a position where the external shape of the extension section 11c and the shaft section 11b of the boss member 11 (refer to FIG. 3(a)) agrees to the external shape of the extension section press-fitting space 36 and the shaft section press-fitting space 37 of the press-fitting section 35 (refer to FIG. 5(a)) as viewed in the press-in direction).

Also, the holding arm is formed into a U-shape in a top view (as viewed in the axis O direction), and holds the shaft section 11b of the boss member 11 on the inner peripheral surface of the U-shape. The inner peripheral surface dimension of the U-shape corresponds to the outer peripheral surface dimension of the shaft section 11c, and the thickness dimension of the U-shape (the holding arm) is made smaller than the gap dimension between the upper surface of the fixing member 31 of the second bracket 30 and the lower surface of the base section 11a (the rubber membrane 13a) of the boss member 11.

From this state, the holding arm of the press-in device is moved toward the press-in direction (the direction orthogonal to the axis O) shown by the arrow A of FIG. 6(a), and the extension section 11c and the shaft section 11b of the boss member 11 are pressed in to the extension section press-fitting space 36 and the shaft section press-fitting space 37 of the press-fitting section 35 through the opening in the side surface. The holding arm of the press-in device further moves, the press-in position of the extension section 11c and the shaft section 11b of the boss member 11 reaches a prescribed position as shown in FIG. 6(b) and FIG. 6(c), and thereby pressing-in (the second bracket fixing step) is completed.

Thus, in the anti-vibration unit 1, the boss member 11 of the anti-vibration device 10 is fixed (pressed in and fixed) to the fixing member 31 of the second bracket 30 by pressing-in, allowing the number of parts to be reduced as much as the bolts can be omitted, compared to the case where the boss member 11 of the anti-vibration device 10 is fixed (fastened and fixed) to the fixing member 31 of the second bracket 30 by bolts as in conventional products.

Also, when the bolts can be omitted, it is not necessary to form female threaded sections for screwing the bolts in the boss member 11 of the anti-vibration device 10 (that is, to bore holes and to cut female threads on the inner peripheral surfaces thereof). Thus, the man-hours during manufacturing can be reduced correspondingly. Further, when the boss member 11 of the anti-vibration device 10 is to be chemically treated for vulcanizingly adhering the anti-vibration base 13, it is not necessary to execute a step of protecting the female threaded sections with masking bolts. Therefore the work of attaching and detaching the masking bolts is not required, and the man-hours during manufacturing can be reduced correspondingly. Also, it is not necessary to prepare the masking bolts, and the manufacturing cost can be reduced correspondingly.

Also, scraping chips generated in pressing-in can be discharged to the outside because the extension section press-fitting space 36 in the press-fitting section 35 of the fixing member 31 is formed so as to penetrate in the press-in direction (that is, to be opened in the side surfaces on both sides of the fixing member 31).

Also, with respect to the anti-vibration unit 1, the press-in section of the boss member 11 is formed into a T-shape in the front view (refer to FIG. 3(a)) in which the extension section 11c is extended outward in the radial direction from the projection distal end of the shaft section 11b, a space corresponding to the external shape of the press-in section of the boss member 11 (the extension section press-fitting space 36 and the shaft section press-fitting space 37) is formed in the fixing member 31 of the second bracket 30, and the press-in section of the boss member 11 is pressed in to the space in the direction orthogonal to the axis O through the opening in the side surface of the fixing member 31. Therefore the boss member 11 of the anti-vibration device 10 can be securely fixed to the fixing member 31 of the second bracket 30.

That is, when the first bracket 20 is relatively displaced with respect to the second bracket 30 in the axis O direction (the vertical direction in FIG. 1(b)) of the anti-vibration device 10, the extension section 11c in the press-in section of the boss member 11 engages with the inner wall surface of the space in the press-fitting section 35 (that is, the lower surface of the restriction wall 38), and the state the boss member 11 of the anti-vibration device 10 is fixed to the fixing member 31 of the second bracket 30 can be securely maintained. The same is true when relative displacement to the prying direction (the direction of inclining the axis O of the anti-vibration device 10) is combined thereto.

On the other hand, even when the first bracket 20 is relatively displaced with respect to the second bracket 30 toward the direction orthogonal to the axis O of the anti-vibration device 10 and the direction parallel to the press-in direction (the direction vertical to the paper surface in FIG. 1(b); the right/left direction in FIG. 6(b)) (that is, when the outer tube member 12 of the anti-vibration device 10 is displaced in parallel to the opposite direction of the press-in direction of the boss member 11 (the direction of the arrow A in FIG. 6(a))) by the first bracket 20, a force toward the direction making the extension section 11c incline (that is, the boss member 11 inclines and rotates the extension section 11c) is also generated by elastic deformation of the anti-vibration base 13, because the anti-vibration base 13 is interposed between the outer tube member 12 and the boss member 11, in the boss member 11, and therefore the extension section 11c of the boss member 11 engages with the inner surface wall of the space in the press-fitting section 35 of the fixing member 31 (the bottom surface of the extension section press-fitting space 36 and the lower surface of the restriction wall 38). Thus, the press-in section of the boss member 11 can be prevented from slipping off from the press-fitting section 35 (the extension section press-fitting space 36 and the shaft section press-fitting space 37) of the fixing member 31. Therefore, a state the boss member 11 of the anti-vibration device 10 is fixed to the fixing member 31 of the second bracket 30 can be securely maintained.

Next, an anti-vibration unit 201 in a second embodiment will be described referring to FIG. 7 and FIG. 8. Although, in the first embodiment, a case was described where the extension section press-fitting space 36 and the shaft section press-fitting space 37 of the press-fitting section 35 were formed so as to penetrate in the press-in direction (that is, the openings were provided in both side surfaces of the press-fitting section 35), in a press-fitting section 235 in the second embodiment, a positioning wall 239 is formed, thus the extension section press-fitting space 36 and the shaft section press-fitting space 37 are made not to penetrate in the press-in direction. Also, with respect to the same portions as those of the first embodiment described above, the same reference signs will be given, and the description thereof will be omitted.

Figure 7A:
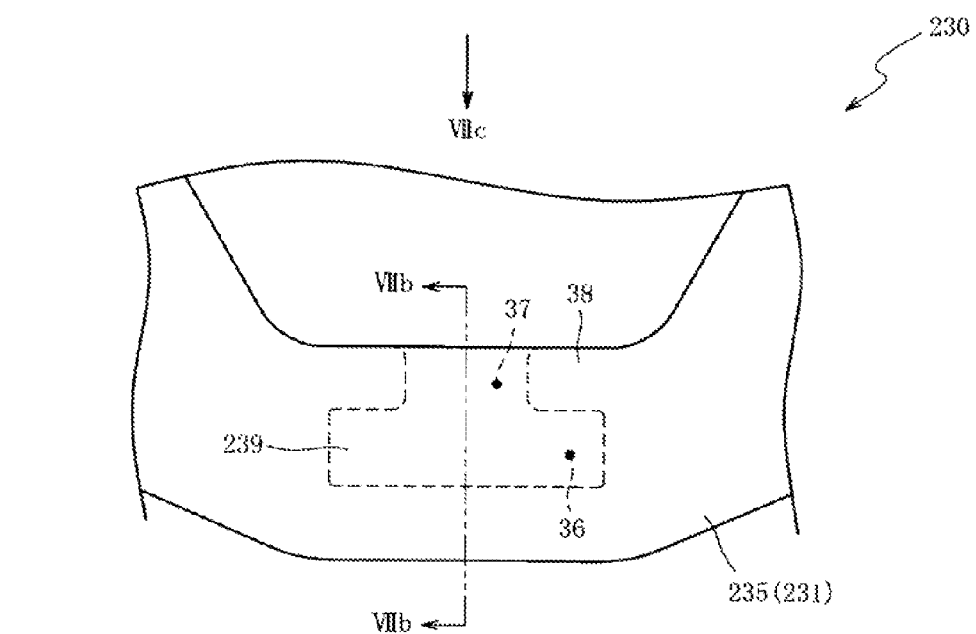
FIG. 7 (a) is a partially enlarged front view of a second bracket in the second embodiment, (b) is a partially enlarged cross-sectional view of the second bracket taken from the line VIIb-VIIb of FIG. 7(a), and (c) is a partially enlarged top view of the second bracket as viewed from the direction of the arrow VIIc of FIG. 7(a).
Figure 7B:
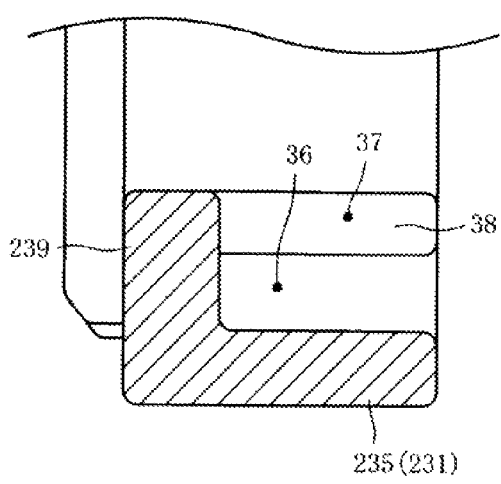
Figure 7C:
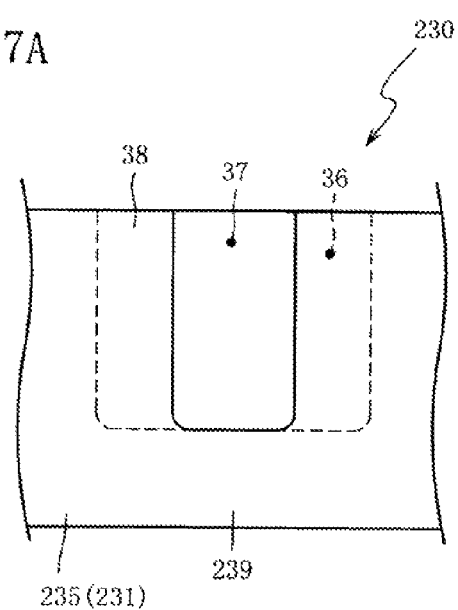

FIG. 7(a) is a partially enlarged front view of a second bracket 230 in the second embodiment, FIG. 7(b) is a partially enlarged cross-sectional view of the second bracket 230 taken from the line VIIb-VIIb of FIG. 7(a), and FIG. 7(c) is a partially enlarged top view of the second bracket 230 as viewed from the direction of the arrow VIIc of FIG. 7(a). Also, FIG. 7(a) corresponds to the front view of FIG. 5(a), and FIG. 7(b) corresponds to the cross-sectional view of FIG. 5(b).

As shown in FIG. 7, in the second embodiment, on one end side (the left side in FIG. 7(b)) in the press-in direction of the extension section press-fitting space 36 and the shaft section press-fitting space 37, the positioning wall 239 is formed. The positioning wall 239 is a portion for positioning the press-in position of the boss member 11 pressed in to the extension section press-fitting space 36 and the shaft section press-fitting space 37, and is formed as a plate-like wall section that blocks one of the openings of the spaces 36, 37. Therefore, in the second embodiment, the press-fitting section 235 includes an opening of the extension section press-fitting space 36 and the shaft section press-fitting space 37 only in the other side surface of a fixing member 231 that is on the opposite side of the positioning wall 239. Also, in the positioning wall 239, the surface on the side facing the both spaces 36, 37 (the right side surface in FIG. 7(b)) is formed as a flat surface that is parallel to the axis O.

Figure 8A:
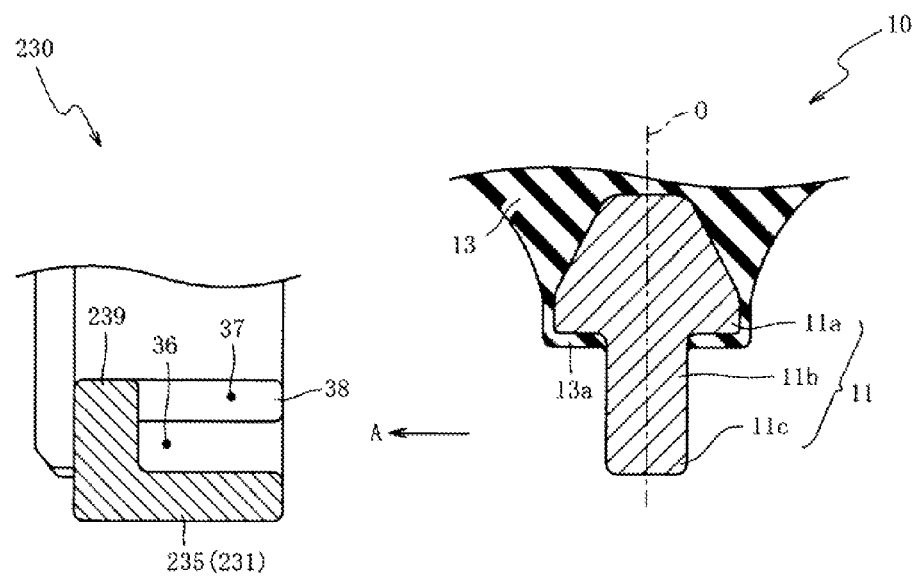
Figure 8B:
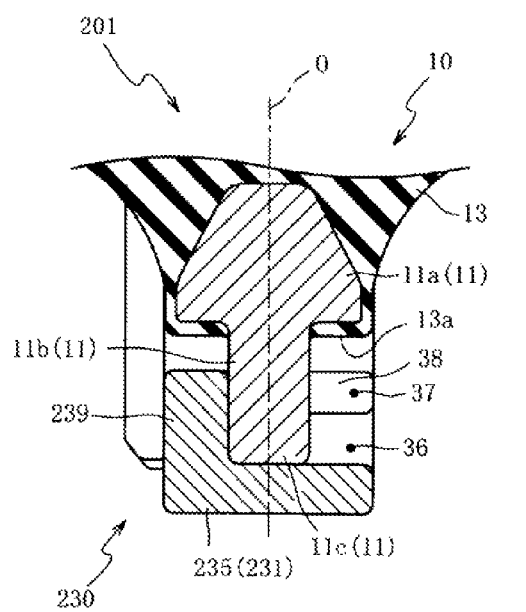
Figure 8C:
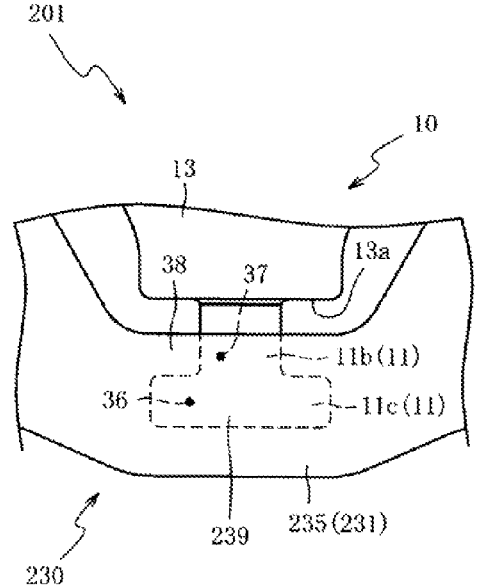

FIG. 8(a) is a partially enlarged cross-sectional view of the anti-vibration unit 201 before pressing-in, FIG. 8(b) is a partially enlarged cross-sectional view of the anti-vibration unit 201 after pressing-in, and FIG. 8(c) is a partially enlarged front view of the anti-vibration unit 201 after pressing-in. FIG. 8(a) and FIG. 8(b) correspond to FIG. 6(a), and FIG. 8(c) corresponds to FIG. 1(b).

As shown in FIG. 8(a), in fixing (pressing-in) of the boss member 11 of the anti-vibration device 10 and the fixing member 231 of the second bracket 230, similarly to the case of the first embodiment, the second bracket 230 is fixed to a table (not illustrated) of the press-in device, and the boss member 11 of the anti-vibration device 10 is held by a holding arm (not illustrated) of the press-in device and is disposed at a pressing-in possible position.

From this state, the holding arm of the press-in device is moved toward the press-in direction (the direction orthogonal to the axis O), and the press-in section (the extension section 11c and the shaft section 11b) of the boss member 11 is pressed in to the extension section press-fitting space 36 and the shaft section press-fitting space 37 of the press-fitting section 235 through the opening in the side surface of the fixing member 231. When the holding arm of the press-in device is further moved to the press-in direction, the positioning wall 239 is made to abut upon the press-in section of the boss member 11, and movement (pressing-in) in the press-in direction is restricted by the abutment. As a result, as shown in FIG. 8(a) and FIG. 8(b), the press-in section of the boss member 11 reaches a prescribed press-in position, and pressing-in (the second bracket fixing step) is completed.

Also, whether or not the press-in section of the boss member 11 has abutted upon the positioning wall 239 is determined by whether or not the press-in load measured by a load sensor (a load cell and the like, for example) arranged on the holding arm of the press-in device has exceeded a reference value.

Thus, in the second embodiment, the press-in position can be positioned by pressing in the press-in section of the boss member 11 to the position of abutting upon the positioning wall 239. Therefore, for example, in comparison to a case where the press-in position of the boss member 11 to the fixing member 231 is managed by the stroke amount of the holding arm of the press-in device, the press-in step can be simplified to reduce the control cost thereof, and the positional accuracy of the press-in position can be improved by preventing the press-in position from being dispersed.

Also, in a product state where pressing-in of the boss member 11 has been completed, the anti-vibration unit 201 is brought into a state where the press-in section of the boss member 11 abuts upon the positioning wall 239 of the press-fitting section 235 (that is, the state the positioning wall 239 supports the press-in section of the boss member 11), and therefore, when the first bracket 20 is relatively displaced with respect to the second bracket 30, the input load can be counteracted utilizing engagement of the press-in section of the boss member 11 and the positioning wall 239. Accordingly, the state the press-in section of the boss member 11 is fixed (pressed in) to the press-fitting section 235 of the fixing member 231 can be securely maintained.

Next, an anti-vibration unit 301 in a third embodiment will be described referring to FIG. 9 and FIG. 10. Although, in the second embodiment, a case was described where the entire surface on the side facing the extension section press-fitting space 36 and the shaft section press-fitting space 37 of the positioning wall 239 was formed as a flat surface, in a positioning wall 339 in the third embodiment, a groove section 339a of a recessed groove shape is recessively arranged in a part of the surface on the side facing the extension section press-fitting space 36 and the shaft section press-fitting space 37. Also, with respect to the same portions as those of the respective embodiments described above, the same reference signs will be given, and description thereof will be omitted.

FIG. 9(a) is a partially enlarged cross-sectional view of a second bracket 330 in the third embodiment, and FIG. 9(b) is a partially enlarged rear view of the second bracket 330 as viewed from the direction of the arrow IXb of FIG. 9(a). FIG. 9(b) corresponds to the cross-sectional view of FIG. 5(b).

As shown in FIG. 9, in the positioning wall 339 in the third embodiment, the groove section 339a is recessively arranged in the surface facing the extension section press-fitting space 36 and the shaft section press-fitting space 37 (the right side surface in FIG. 9(a); that is, the surface on the side upon which the press-in section of the boss member 11 abuts). The positioning wall 339 has the same configuration as that of the positioning wall 239 in the second embodiment except for the presence/absence of the groove section 339a, and description thereof will be omitted.

The groove section 339a is a recessed groove for storing the scraping chips in pressing-in (the scraping chips generated after the outer wall surface of the press-in section or the inner wall surface of a press-fitting section 335 is scraped when the press-in section of the boss member 11 is pressed in to the press-fitting section 335 of a fixing member 331), and is extended along the outer periphery that continues to the inner wall surface of the press-fitting section 335 in the surface facing the extension section press-fitting space 36 and the shaft section press-fitting space 37 (the right side surface in FIG. 9(a)).

In the present embodiment, the groove section 339a is extended only by the width (the width in the right/left direction in FIG. 9(b) and FIG. 9(c)) equal to that of the bottom surface (the lower surface in FIG. 9(a) and FIG. 9(b)) forming the extension section press-fitting space 36 out of the inner wall surface of the press-fitting section 335 along the outer periphery that continues to the bottom surface. Also, the cross-sectional shape of the groove section 339a is made into a semicircular shape, and smoothly continues to the bottom surface that forms the extension section press-fitting space 36.

FIG. 10(a) is a partially enlarged cross-sectional view of the anti-vibration unit 301 after pressing-in, and FIG. 10(b) is a partially enlarged front view of the anti-vibration unit 301 after pressing-in. FIG. 10(a) corresponds to FIG. 6(a), and FIG. 10(b) corresponds to FIG. 1(b).

In fixing (pressing-in) of the boss member 11 of the anti-vibration device 10 and the fixing member 331 of the second bracket 330, similarly to the case of the second embodiment, the second bracket 330 is fixed to a table (not illustrated) of the press-in device, the boss member 11 of the anti-vibration device 10 is held by a holding arm (not illustrated) of the press-in device, the holding arm of the press-in device is moved to the press-in direction, and thereby the press-in section (the extension section 11c and the shaft section 11b) of the boss member 11 are pressed in to the position abutting upon a positioning wall 339 as shown in FIG. 10.

In this case, in the positioning wall 339, the groove section 339a is recessively arranged in the surface on the side upon which the press-in section of the boss member 11 abuts, and therefore, when scraping chips are generated in pressing in the press-in section of the boss member 11 to the press-fitting section 335 of the fixing member 331, the scraping chips can be stored in the groove section 339a. That is, when the scraping chips are caught between the press-in section of the boss member 11 and the positioning wall 339, dispersion occurs in the press-in position (the position in the right/left direction in FIG. 9(a)) of the boss member 11. However, according to the anti-vibration unit 301, the scraping chips can be stored in the groove section 339a, the press-in section of the boss member 11 can be tightly attached to the positioning wall 339, and therefore the positional accuracy of the press-in position of the boss member 11 can be secured.

Also, in the third embodiment, the groove section 339a is formed only in the outer periphery on the lower side of the positioning wall 339 (that is, the outer periphery continuing to the bottom surface side of the extension section press-fitting space 36). Therefore, while the strength of the positioning wall 339 is secured with the formation region of the groove section 339a as the required minimum, the scraping chips generated by pressing-in and dropped on the bottom surface of the extension section press-fitting space 36 can be efficiently stored in the groove section 339a. Also, stress concentration can be inhibited and the strength of the positioning wall 339 can be secured because the groove section 339a is formed as a recessed groove with a semi-circular cross section.

Next, an anti-vibration unit 401 in a fourth embodiment will be described referring to FIG. 11. Although a case where the shaft section 11b and the extension section 11c of the boss member 11 exposed the outer wall surface in the first embodiment was described, the outer wall surfaces of the shaft section 11b and the extension section 11c of the boss member 11 in the fourth embodiment are covered by a rubber membrane 413a. With respect to the same portions as those of the respective embodiments described above, the same reference signs will be given, and description thereof will be omitted.

FIG. 11(a) is a partially enlarged cross-sectional view of an anti-vibration unit 401 after pressing-in in the fourth embodiment, and FIG. 11(b) is a partially enlarged front view of the anti-vibration unit 401 after pressing-in. FIG. 11(a) corresponds to FIG. 6(a), and FIG. 11(b) corresponds to FIG. 1(b).

With respect to an anti-vibration device 410 in the fourth embodiment, in addition to that the shaft section 11b of the boss member 11 is covered by the rubber membrane 13a, the entire outer wall surface of the shaft section 11b and the extension section 11c is covered by the rubber membrane 413a that continues to the anti-vibration base 13 through the rubber membrane 13a. Thus, in manufacturing the anti-vibration device 410, the work of removing the rubber burr attached to the outer wall surface of the boss member 11 can be omitted as in the case of the first embodiment, and therefore the man-hours can be reduced. Also, the required accuracy of the sealing performance of the vulcanizing mold can be made loose, because the entire boss member 11 is configured to be covered by the rubber membrane 13a, 413a, compared with the case of the first embodiment, and therefore the manufacturing cost can be reduced correspondingly.

Next, an anti-vibration unit 501 in a fifth embodiment will be described referring to FIG. 12 and FIG. 13. Although a case where the extension section 11c of the boss member 11 was formed into a rectangular shape (refer to FIG. 3(b)) as viewed in the axis O direction was described in the first embodiment, an extension section 511c in the fifth embodiment is formed into a circular shape as viewed in the axis O direction. Also, with respect to the same portions as those of the respective embodiments described above, the same reference signs will be given, and description thereof will be omitted.

FIG. 12(a) is a partially enlarged front view of an anti-vibration device 510 in the fifth embodiment, and FIG. 12(b) is a cross-sectional view of a boss member 511 taken from the line XIIb-XIIb of FIG. 12(a). FIG. 12(a) corresponds to the front view of the anti-vibration device 10 as viewed from the direction of the arrow IIIa of FIG. 2.

As shown in FIG. 12, the boss member 511 in the fifth embodiment is formed so that the extension section 511c extends in a flange shape from the projection distal end of the shaft section 11b outward in the radial direction (the direction orthogonal to the axis O). With respect to the boss member 511, similarly to the case of the first embodiment, a part of the shaft section 11b and the extension section 511c are made to be the press-in section that is pressed in to the press-fitting section 35 of the second bracket 30.

The extension section 511c is constant in the thickness dimension (the dimension in the vertical direction in FIG. 12(a)), is formed into a disk shape that is circular as viewed in the axis O direction, and is disposed so as to be concentric with the shaft section 11b. Therefore, the boss member 511 is formed into a shape that is symmetric around the axis O. Also, in a front view shown in FIG. 12(a), the press-in section (the shaft section 11b and the extension section 511c) of the boss member 511 comes to have a generally T-shape.

Also, the shape in the front view shown in FIG. 12(a) of the boss member 511 is formed to have equal dimensions with those of the shape in the front view shown in FIG. 3(a) of the boss member 11 in the first embodiment. In this case, the diameter dimension as viewed in the axis 0 direction of the extension section 511c is made smaller than the width dimension (the right/left direction in FIG. 13(a)) of the press-fitting section 35 (the extension section press-fitting space 36 and the shaft section press-fitting space 37) of the second bracket 30.

Figure 13B:
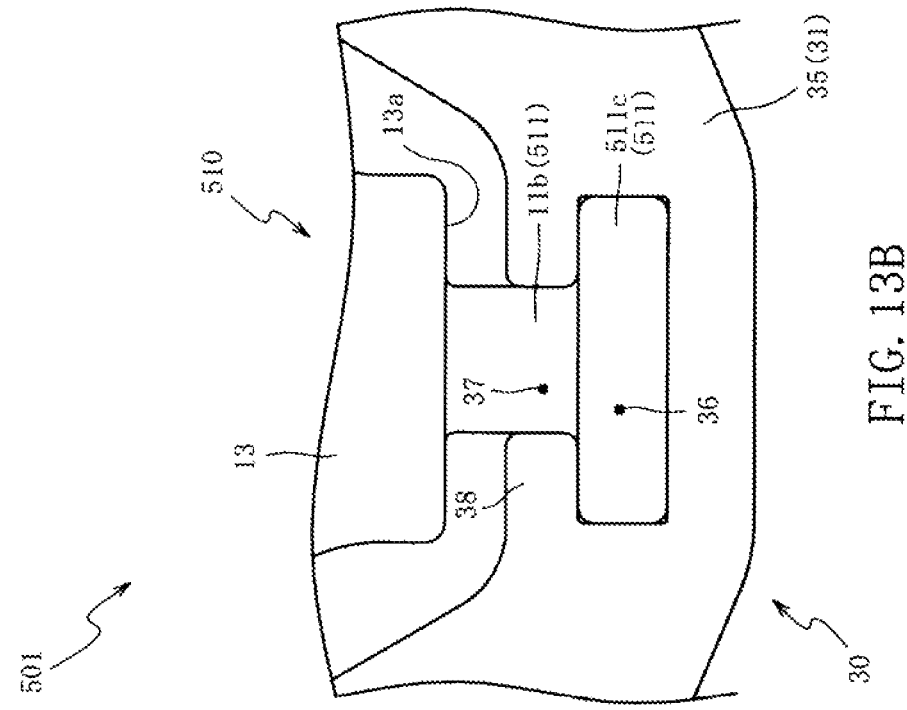
Figure 13A:
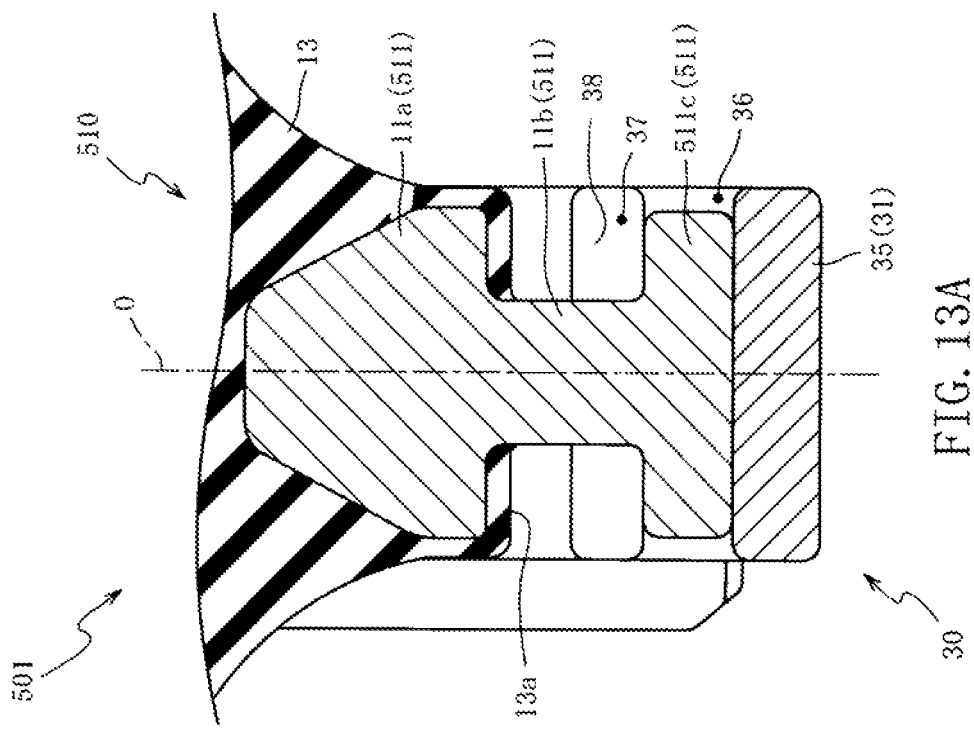

FIG. 13(a) is a partially enlarged cross-sectional view of the anti-vibration unit 501 after pressing-in, and FIG. 13(b) is a partially enlarged front view of the anti-vibration unit 501 after pressing-in. FIG. 13(a) corresponds to FIG. 6(a), and FIG. 13(b) corresponds to FIG. 1(b).

In fixing (pressing-in) of the boss member 511 of the anti-vibration device 510 and the fixing member 31 of the second bracket 30, similarly to the case of the first embodiment, the second bracket 30 is fixed to a table (not illustrated) of the press-in device, and the boss member 511 of the anti-vibration device 510 is held by a holding arm (not illustrated) of the press-in device, the holding arm of the press-in device is moved to the press-in direction, and thereby the press-in section (the extension section 511c and the shaft section 11b) of the boss member 511 is pressed in to a prescribed press-in position as shown in FIG. 13.

Thus, with respect to the anti-vibration unit 501 in the fifth embodiment, it is not necessary to consider the orientation in the peripheral direction because the extension section 511c of the boss member 511 is formed into a disk shape that is concentric with the shaft section 11b. Therefore, in arranging the boss member 511 into the vulcanizing mold at the time of vulcanizing molding of the anti-vibration base 13, the work can be executed without considering the orientation around the axis O of the boss member 511 at the time of arranging the same. Similarly, in pressing in the outer tube member 12 of the anti-vibration device 510 to the press-in hole of the first bracket 20 in the axis O direction for holding (the first bracket holding step; refer to FIG. 2), the work can be executed without considering the orientation around the axis O of the anti-vibration device 510 at the time of pressing in the same. That is, the work of positioning the boss member 511 or the anti-vibration device 510 in the peripheral direction can be omitted, and the man-hours during manufacturing can be reduced correspondingly.

Also, by forming the extension section 511c of the boss member 511 into a disk shape of a circular shape as viewed in the axis O direction, the engagement area between such the extension section 511c and the inner wall surface in the extension section press-fitting space 36 of the press-fitting section 35 (the bottom surface of the extension section press-fitting space 36 and the lower surface of the restriction wall 38) can be enlarged. Thus, as described above, even when the first bracket 20 is relatively displaced with respect to the second bracket 30, by utilizing engagement of the extension section 511c and the inner wall surface of the extension section press-fitting space 36, the press-in section of the boss member 511 can be prevented from slipping off from the press-fitting section 35 (the extension section press-fitting space 36 and the shaft section press-fitting space 37) of the fixing member 31. Therefore, a state the boss member 511 of the anti-vibration device 510 is fixed to the fixing member 31 of the second bracket 30 can be securely maintained.

Next, an anti-vibration unit 601 in a sixth embodiment will be described referring to FIG. 14 and FIG. 15. In the anti-vibration unit 601 in the sixth embodiment, with respect to the anti-vibration unit 501 in the fifth embodiment, a positioning wall 639 is arranged in the extension section press-fitting space 36 and the shaft section press-fitting space 37 of a press-fitting section 635. The anti-vibration unit 601 in the sixth embodiment and the anti-vibration unit 501 in the fifth embodiment are different from each other only in presence/absence of the positioning wall 639 and are the same with respect to the rest, therefore description thereof will be omitted. Further, with respect to the same portions as those of the respective embodiments described above, the same reference signs will be given, and description thereof will be omitted.

Figure 14A:
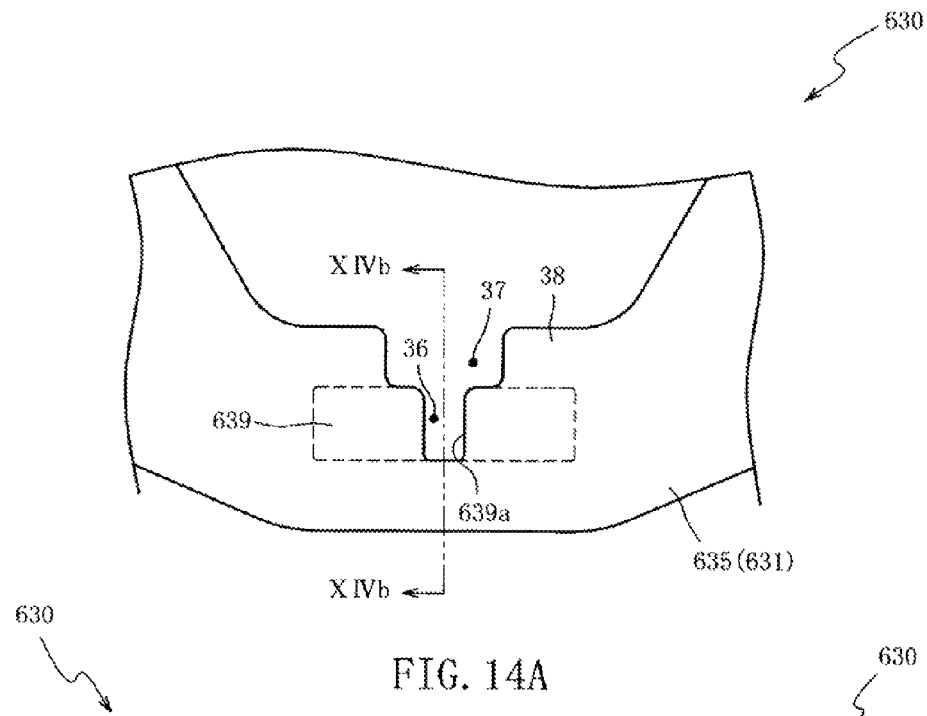
FIG. 14 (a) is a partially enlarged front view of a second bracket in the sixth embodiment, (b) is a partially enlarged cross-sectional view of the second bracket taken from the line XIVb-XIVb in FIG. 14(a), and (c) is a partially enlarged cross-sectional view of the second bracket taken from the line XIVc-XIVc in FIG. 14(b)
Figure 14B:
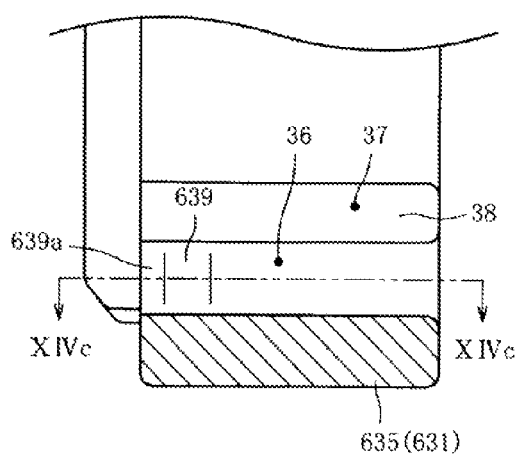
Figure 14C:
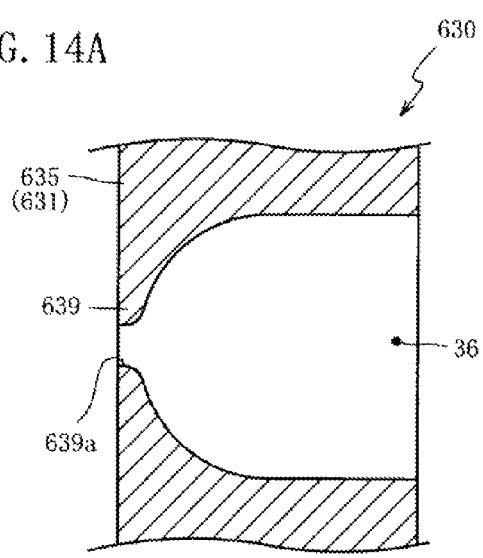

FIG. 14(a) is a partially enlarged front view of a second bracket 630 in the sixth embodiment, FIG. 14(b) is a partially enlarged cross-sectional view of the second bracket 630 taken from the line XIVb-XIVb in FIG. 14(a), and FIG. 14(c) is a partially enlarged cross-sectional view of the second bracket 630 taken from the line XIVc-XIVc in FIG. 14(b). FIG. 14(a) corresponds to FIG. 5(a), and FIG. 14(b) corresponds to the cross-sectional view of FIG. 5(b).

As shown in FIG. 14, in the press-fitting section 635 in the sixth embodiment, the positioning wall 639 is formed. The positioning wall 639 is a portion for positioning the press-in position of the boss member 511 pressed in to the extension section press-fitting space 36 and the shaft section press-fitting space 37, and is formed as a wall section that blocks an opening on one end side (the left side in FIG. 14(b)) in the press-in direction of the extension section press-fitting space 36 on the one end side. Also, in the present embodiment, the positioning wall 639 is not formed in the shaft section press-fitting space 37, and the cross-sectional shape of the shaft section press-fitting space 37 is made constant along the press-in direction (the right/left direction in FIG. 14(b).

With respect to the positioning wall 639, the surface on the side facing the extension section press-fitting space 36 (the right side surface in FIG. 14(b), that is, the surface on the side the press-in section (the extension section 511c) of the boss member 11 abuts upon) is formed into a state curving in an arc shape in the top view and recessed as shown in FIG. 14(c). The arc shape in this top view is formed corresponding to (that is, with an equal diameter dimension) the circular shape as viewed in the axis O direction in the extension section 511c of the boss member 511 (refer to FIG. 12(b)).

In the center in the width direction (the right/left direction in FIG. 14(a)) of the positioning wall 639, an opening 639a of a slit shape is formed. The opening 639a is an opening for discharging the scraping chips generated in pressing-in to the outside, the upper end side (the upper side in FIG. 14(a)) is made to communicate with the shaft section press-fitting space 37, and the lower end side (the lower side in FIG. 14(a)) continues to the bottom surface of the extension section press-fitting space 36 (the inner wall surface of the press-fitting section 635).

Figure 15B:
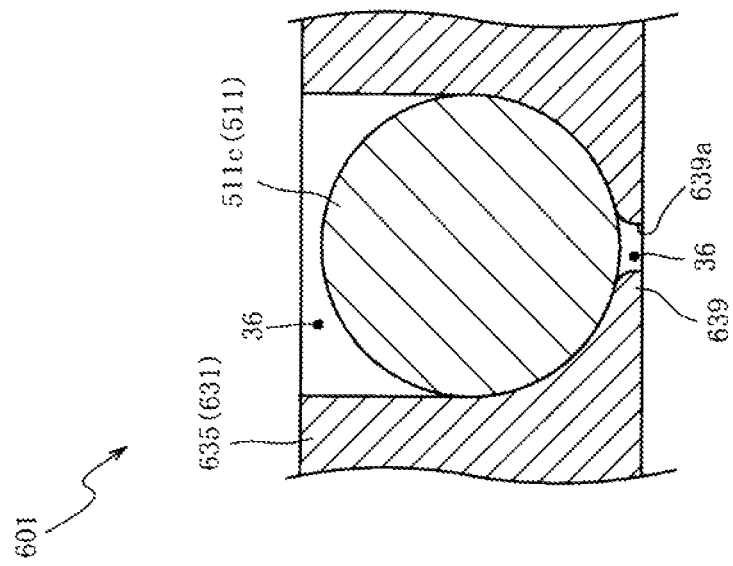
FIG. 15 (a) is a partially enlarged front view of the anti-vibration unit after pressing-in, and (b) is a partially enlarged cross-sectional view of the anti-vibration unit taken from the line XVb-XVb of FIG. 15(a).
Figure 15A:
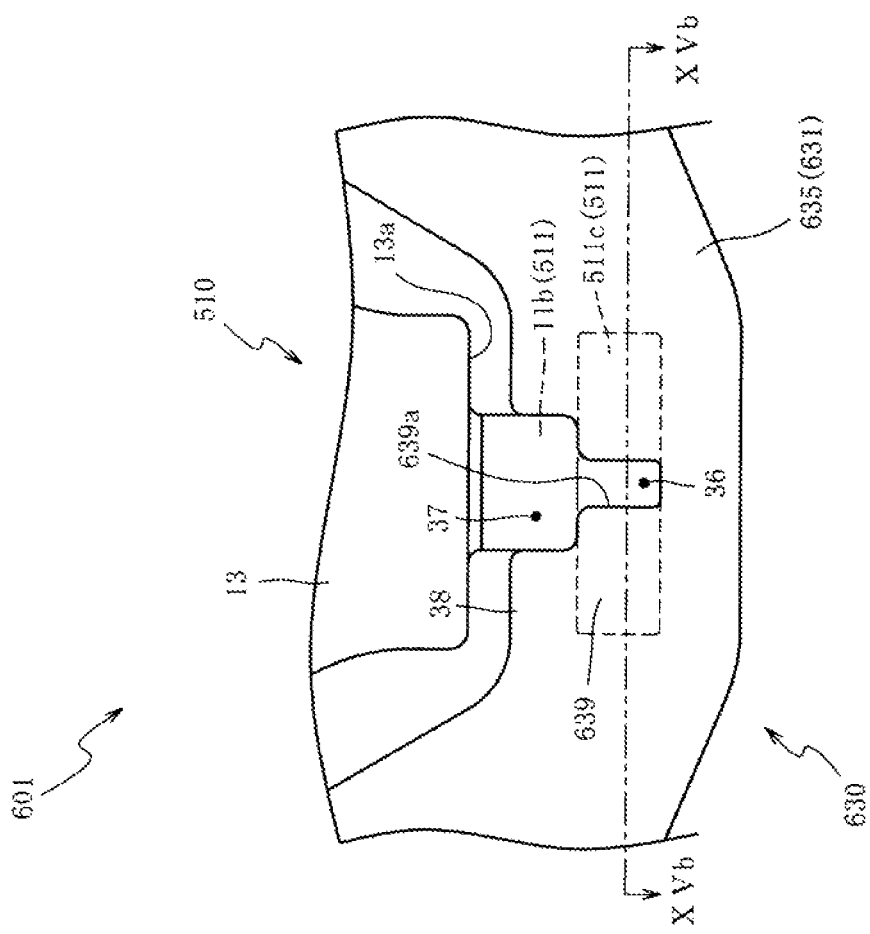

FIG. 15(a) is a partially enlarged front view of the anti-vibration unit 601 after pressing-in, and FIG. 15(b) is a partially enlarged cross-sectional view of the anti-vibration unit 601 taken from the line XVb-XVb of FIG. 15(a). FIG. 14(a) corresponds to FIG. 1(b).

In fixing (pressing-in) of the boss member 511 of the anti-vibration device 510 and a fixing member 631 of the second bracket 630, similarly to the case of the fifth embodiment, the second bracket 630 is fixed to a table (not illustrated) of the press-in device, and the boss member 511 of the anti-vibration device 510 is held by a holding arm (not illustrated) of the press-in device and is disposed at a pressing-in possible position.

From this state, the holding arm of the press-in device is moved toward the press-in direction (the direction orthogonal to the axis O), and the press-in sections (the extension section 511c and a shaft section 511b) of the boss member 511 are pressed in to the extension section press-fitting space 36 and the shaft section press-fitting space 37 of the press-fitting section 635 through the opening in the side surface of the fixing member 631. When the holding arm of the press-in device is further moved to the press-in direction, the positioning wall 639 is made to abut upon the press-in section (the extension section 511c) of the boss member 511, and movement (pressing-in) in the press-in direction is restricted by the abutment. As a result, as shown in FIG. 14(a) and FIG. 14(b), the press-in section of the boss member 511 comes to reach a prescribed press-in position, and pressing-in (the second bracket fixing step) is completed.

Thus, in the sixth embodiment, by pressing in the press-in section of the boss member 511 to the position for abutting upon the positioning wall 639, the press-in position can be positioned. Therefore, the press-in step can be simplified to reduce the control cost the press-in section, and the positional accuracy of the press-in position can be improved by preventing the press-in position from being dispersed. Also, in a product state after pressing-in, the input load can be counteracted utilizing engagement of the press-in section (the extension section 511c) of the boss member 511 and the positioning wall 639. Therefore a state the press-in section of the boss member 511 is fixed (pressed in) to the press-fitting section 635 of the fixing member 631 can be securely maintained.

In this case, the width dimension (the dimension in the vertical direction in FIG. 15(b)) of the press-fitting section 635 is prevented from increasing and the second bracket 630 can be miniaturized while positioning of the press-in position of the boss member 511 is enabled because the positioning wall 639 is formed so as to curve in an arc shape in the top view as shown in FIG. 15(b). Also, when the extension section 511c of the boss member 511 is formed into a square shape as viewed in the axis O direction for example, in order to suppress the width dimension of the press-fitting section 635, it is necessary to make the entire positioning wall thin. However, when the positioning wall can be made to curve in an arc shape as in the present embodiment, both ends of the positioning wall 639 can be made thick, and the stiffness thereof can be secured.

Also, when scraping chips are generated in pressing in the boss member 511 to the press-fitting section 635, the scraping chips can be discharged to the outside through the opening 639a because the opening 639a is formed in the positioning wall 639. Thus, the scraping chips can be prevented from being caught, the press-in section (the extension section 511c) of the boss member 511 can be tightly attached to the positioning wall 639, and therefore the positional accuracy of the press-in position of the boss member 511 can be secured.

Here, the plate width (the dimension in the vertical direction in FIG. 15(b)) of the center part in the width direction (the right/left direction in FIG. 15(b)) becomes thin because the positioning wall 639 is formed so as to curve in an arc shape in the top view as described above. In this case, unless the opening 639a is arranged, it is necessary to increase the plate thickness of the positioning wall 639 (the center part in the width direction) in order to secure the strength (to prevent breakage) of the center part in the width direction in restricting the press-in position of the boss member 511, and the second bracket 630 (the fixing member 631) becomes large correspondingly. On the other hand, in the present embodiment, the second bracket 630 (the fixing member 631) can be miniaturized while securing the strength (preventing breakage of the center part in the width direction) of the positioning wall 639 because the opening 639a is formed in the center part in the width direction of the positioning wall 639.

Next, an anti-vibration unit 701 in a seventh embodiment will be described referring to FIG. 16 to FIG. 18. In the first embodiment, a case was described where the press-in section of the anti-vibration device 10 was pressed in the direction orthogonal to the axis O with respect to the press-fitting section 35 of the second bracket 30. However, in an anti-vibration device 710 in the seventh embodiment, the press-in section thereof is pressed in the axis O direction with respect to a press-fitting section 735 of a second bracket 730. With respect to the same portions as those of the respective embodiments described above, the same reference signs will be given, and description thereof will be omitted.

FIG. 16(a) is a partially enlarged front view of an anti-vibration device 710 in the seventh embodiment, and FIG. 16(b) is a cross-sectional view of a boss member 711 taken from the line XVIb-XVIb of FIG. 16(a). FIG. 16(a) corresponds to FIG. 3(a).

As shown in FIG. 16, the boss member 711 is formed so that a shaft section 711b projects downward from the base section 11a. The shaft section 711b is formed as a shaft-like body with a circular cross section, and the cross-sectional area thereof is made constant along the axis O. In the seventh embodiment, this shaft section 711b is the press-in section which is pressed in to the press-fitting section 735 (refer to FIG. 17) of the second bracket 730.

Figure 17B:
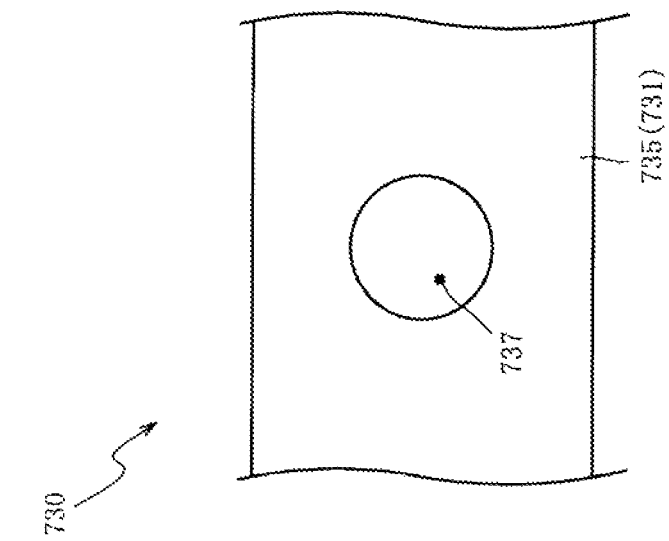
FIG. 17 (a) is a partially enlarged front view of the second bracket, and (b) is a partially enlarged top view of the second bracket as viewed from the arrow XVIIb of FIG. 17(a).
Figure 17A:
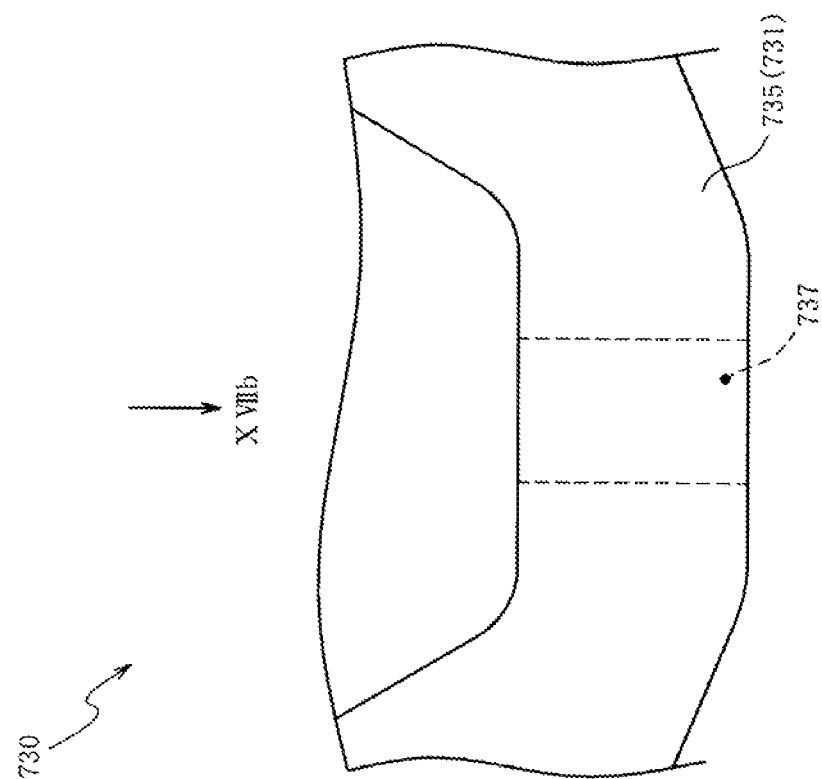

FIG. 17(a) is a partially enlarged front view of the second bracket 730, and FIG. 17(b) is a partially enlarged top view of the second bracket 730 as viewed from the arrow XVIIb of FIG. 17(a). FIG. 17(a) corresponds to FIG. 5(a).

As shown in FIG. 17, the press-fitting section 735 in a fixing member 731 of the second bracket 730 includes a shaft section press-fitting space 737. The shaft section press-fitting space 737 is a space where the shaft section 711b (refer to FIG. 16) in the boss member 711 of the anti-vibration device 710 is pressed in, and is penetratingly formed as a through hole with a circular cross section in the press-fitting section 735 of the fixing member 731. The inside diameter dimension of the shaft section press-fitting space 737 is made smaller than the outside diameter dimension of the shaft section 711b of the boss member 711, and the press-in allowance at the time of pressing-in is secured.

FIG. 18(a) is a partially enlarged front view of the anti-vibration unit 701 after pressing-in, and FIG. 18(b) is a partially enlarged cross-sectional view of the anti-vibration unit 701 taken from the line XVIIIb-XVIIIb of FIG. 18(a).

In manufacturing the anti-vibration unit 701, the anti-vibration device 710 (the outer tube member 12) is pressed in to and held by the first bracket 20 (the first bracket holding step; refer to FIG. 2), the stopper rubber SG (refer to FIG. 1) is furnished, the boss member 711 (the press-in section) of the anti-vibration device 710 is thereafter fixed by being pressed in to the fixing member 731 (the press-fitting section 735) of the second bracket 730 (the second bracket fixing step; refer to FIG. 18), and thereby manufacturing of the anti-vibration unit 701 is completed.

In fixing (pressing-in) of the boss member 711 of the anti-vibration device 710 and the fixing member 731 of the second bracket 730, first, the second bracket 730 is fixed to a table (not illustrated) of the press-in device, the boss member 711 of the anti-vibration device 710 is held by a first holding arm (not illustrated) of the press-in device, and the first bracket 20 is held by a second holding arm (not illustrated) of the press-in device. Then, the first holding arm and the second holding arm are relatively moved in the axis O direction of the anti-vibration device 710, and the anti-vibration device 710 (the anti-vibration base 13) is compressively deformed in the axis O direction.

While maintaining this compressively deformed state, the first and second arms are moved in parallel, the anti-vibration device 710 is fit within the frame of the second bracket 730, and is disposed at the pressing-in possible position (that is, the position where the center (the axis O) of the shaft section 711b of the boss member 711 agrees to the center of the shaft section press-fitting space 737 of the press-fitting section 735 as viewed in the press-in direction).

From this state, the first holding arm of the press-in device is moved toward the press-in direction (the axis 0 direction), and the shaft section 711b of the boss member 711 is pressed in to the shaft section press-fitting space 737 of the press-fitting section 735. The first holding arm of the press-in device is further moved, the press-in position of the shaft section 711b of the boss member 711 reaches a prescribed position as shown in FIG. 18(a) and FIG. 18(b), and thereby pressing-in (the second bracket fixing step) is completed.

With the anti-vibration unit 701 pressed in to the prescribed position (the product state), the upper end side of the anti-vibration device 710 is made to abut upon the lower surface side of the connection member 33 of the second bracket 730 (refer to FIG. 1(b)).

With respect to the anti-vibration unit 701 in the seventh embodiment, it is not necessary to consider the orientation in the peripheral direction because the boss member 711 is formed into a symmetric shape around the axis O. Therefore, in arranging the boss member 711 into the vulcanizing mold at the time of vulcanizing molding of the anti-vibration base 13, the work can be executed without considering the orientation around the axis O of the boss member 711 at the time of arranging the same. Similarly, in pressing in the outer tube member 12 of the anti-vibration device 710 to the press-in hole of the first bracket 20 in the axis O direction for holding the outer tube member 12 (the first bracket holding step; refer to FIG. 2), the work can be executed without considering the orientation around the axis O of the anti-vibration device 710 at the time of pressing in the same. That is, the work for positioning the boss member 711 or the anti-vibration device 710 in the peripheral direction can be omitted, and the man-hours during manufacturing can be reduced correspondingly.

Also, when scraping chips are generated in pressing in the boss member 711 to the press-fitting section 735, the scraping chips can be discharged to the outside through an opening on the lower surface side (the lower side in FIG. 18(b)) of the shaft section press-fitting space 737 because the shaft section press-fitting space 737 of the press-fitting section 735 is formed as a through hole. Thus, the press-in section (the shaft section 711b) of the boss member 711 can be pressed in to the prescribed position without being interfered by the scraping chips, and the positional accuracy of the press-in position of the boss member 711 can be secured.

Next, an anti-vibration unit 801 in an eighth embodiment will be described referring to FIG. 19. In the first embodiment, a case was described where, when the press-in section of the anti-vibration device 10 was pressed in to the press-fitting section 35 of the second bracket 30, the upper end side (the opposite side of the press-in section) of the anti-vibration device 10 was fit within the frame (below the lower surface of the connection member 33) of the second bracket 30 (that is, a case where pressing-in is possible even if the anti-vibration device 10 is not compressively deformed in the axis O direction). However, with respect to the anti-vibration unit 801 in the eighth embodiment, the upper end side (the opposite side of the press-in section) of an anti-vibration device 810 is not fit within the frame (below the lower surface of the connection member 33) of the second bracket 30 in pressing in the press-in section of the anti-vibration device 810 to the press-fitting section 35 of the second bracket 30, therefore it is necessary to compressively deform the anti-vibration device 810 in the axis O direction. Also, with respect to the same portions as those of the respective embodiments described above, the same reference signs will be given, and description thereof will be omitted.

Figure 19:
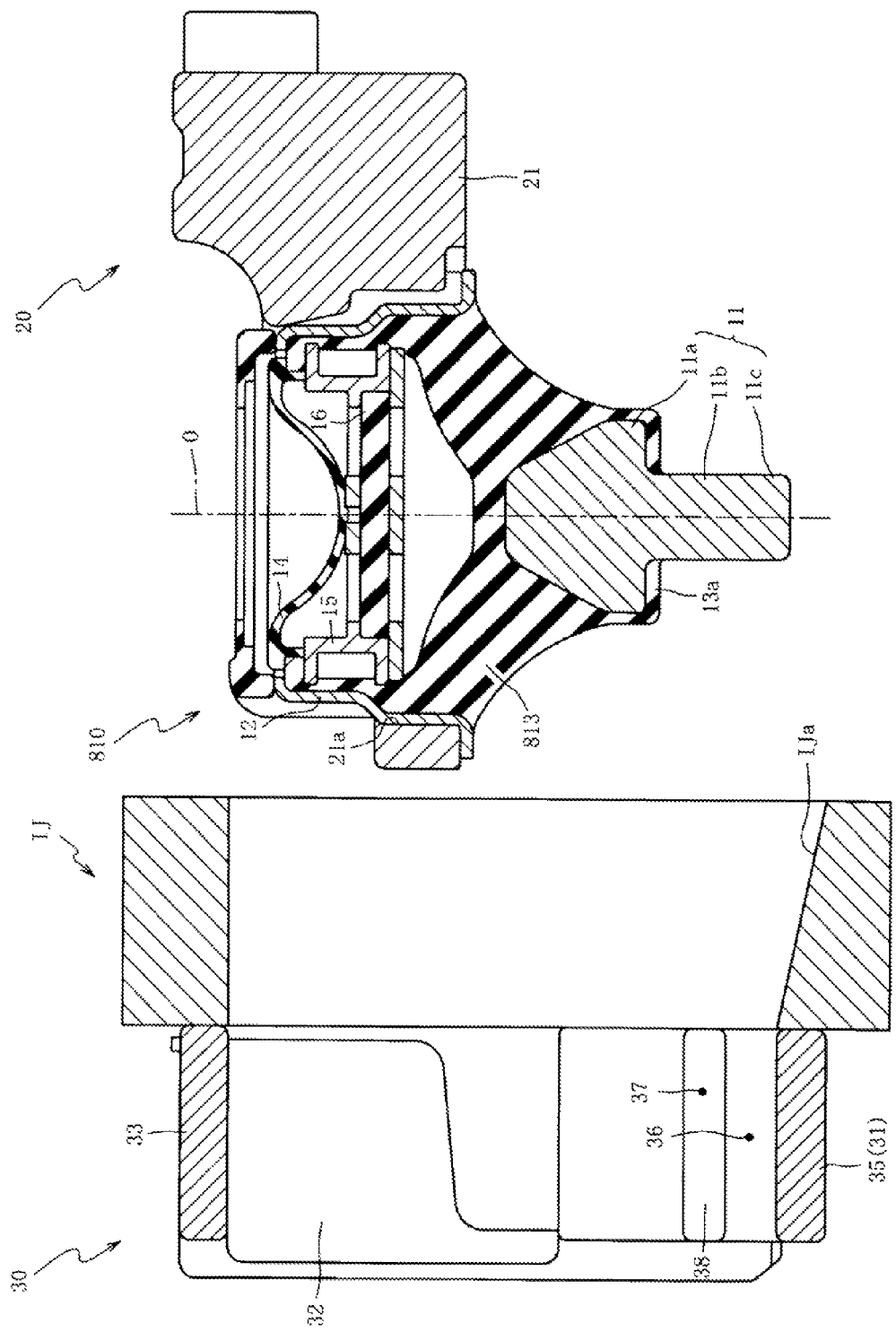
FIG. 19 is a cross-sectional view of the anti-vibration unit before pressing-in in the eighth embodiment.

FIG. 19 is a cross-sectional view of the anti-vibration unit 801 in the eighth embodiment, and a state before pressing-in is illustrated. FIG. 19 corresponds to FIG. 6(a).

The anti-vibration unit 801 in the eighth embodiment is different from the anti-vibration unit 1 in the first embodiment only in that the anti-vibration device 810 is different from the anti-vibration device 10 in the first embodiment. More specifically, in the anti-vibration device 810, the leg length of an anti-vibration base 813 is made longer than the leg length of the anti-vibration base 13 of the anti-vibration device 10 in the first embodiment, and the height dimension (the height in the axis O direction) of the anti-vibration device 810 is made larger than the height dimension of the anti-vibration device 10. Configurations except for the anti-vibration base 813 are the same between the anti-vibration devices 10 and 810, and description thereof will be omitted.

As shown in FIG. 19, in manufacturing the anti-vibration unit 801, the anti-vibration device 810 (the outer tube member 12) is pressed in to and held by the first bracket 20 (the first bracket holding step; refer to FIG. 2), the stopper rubber SG (refer to FIG. 1) is furnished, the boss member 11 (the press-in section) of the anti-vibration device 810 is thereafter fixed by being pressed in to the fixing member 31 (the press-fitting section 35) of the second bracket 30 (the second bracket fixing step; refer to FIG. 18), and thereby manufacturing of the anti-vibration unit 801 is completed.

Here, with respect to the anti-vibration device 810 of the anti-vibration unit 801, the upper end side (the opposite side of the press-in section) of the anti-vibration device 810 is not fit within the frame (below the lower surface of the connection member 33) of the second bracket 30 when pressing in because the height dimension of the anti-vibration device 810 is large. In this case, it is possible to compressively deform the anti-vibration device 810 (the anti-vibration base 813) in the axis O direction and to press in by holding the boss member 11 of the anti-vibration device 810 by the first holding arm of the press-in device, holding the first bracket 20 by the second holding arm of the press-in device, and relatively moving these first holding arm and second holding arm in the axis O direction of the anti-vibration device 810.

However, in this method, it is necessary to use a press-in device in which the first holding arm and the second holding arm can generate the load not only in the press-in direction but also in the direction (the axis O direction) orthogonal to the press-in direction and movement in the press-in direction (the direction orthogonal to the axis O direction) is possible while maintaining a state where the load is generated in such direction, and the facility cost increases. Also, a step of compressively deforming the anti-vibration device 810 in the axis O direction is required before the press-in step, and the man-hours increase.

On the other hand, in the present embodiment, as described below, by pressing in the boss member 11 (the press-in section) of the anti-vibration device 810 to the fixing member 31 (the press-fitting section 35) of the second bracket 30 using a press-in jig IJ, reduction of the facility cost and reduction of the man-hours are achieved.

That is, in the present embodiment, as shown in FIG. 19, with the press-in jig IJ arranged in the press-in side opening of the second bracket 30 side by side, these second bracket 30 and the press-in jig IJ are fixed to a table (not illustrated) of the press-in device. The press-in jig IJ is for executing the compression motion of deforming the anti-vibration device 810 in the axis O direction at the time of press-in motion simultaneously (serving for two purposes), and is formed of an iron and steel material into a frame shape corresponding to the second bracket 30.

The press-in jig IJ includes an inclined surface IJa for guiding the boss member 11. The inclined surface IJa is a flat surface having a width dimension equal to the width dimension (the dimension in the direction vertical to the paper surface in FIG. 19) of the bottom surface (the lower surface in FIG. 19) of the extension section press-fitting space 36 in the press-fitting section 35 of the second bracket 30, and is configured so that the final end side (the left side in FIG. 19) smoothly continues to the bottom surface of the extension section press-fitting space 36 where the jig IJ is fixed to the table of the press-in device and so as to incline downward from the final end side to the starting end side.

Pressing-in of the boss member 11 (the press-in section) of the anti-vibration device 810 to the fixing member 31 (the press-fitting section 35) of the second bracket 30 is executed by holding the first bracket 20 by the first arm of the press-in device, holding the boss member 11 of the anti-vibration device 810 by the second arm of the press-in device, and moving these first arm and second arm in the press-in direction (the direction orthogonal to the axis O). The second arm is configured similarly to the holding arms described above.

Here, in the press-in device used in the present embodiment, the first arm is formed so as to be movable only in the press-in direction (the direction orthogonal to the axis O), and, in pressing-in, restricts the outer tube member 12 from moving in a direction other than the press-in direction (for example, moving in the axis O direction, and inclining with respect to the axis O direction). On the other hand, the second arm is formed so as to be movable in the press-in direction (the direction orthogonal to the axis O), is formed so as to passively move in the direction (the axis O direction) orthogonal to the press-in direction. In pressing-in, although the boss member 11 of the anti-vibration device 810 is allowed to move in the direction (the axis O direction) orthogonal to the press-in direction, the second arm restricts movement in another direction (other than the press-in direction) (for example, inclining with respect to the axis O direction).

Therefore, from a state shown in FIG. 19, by movement of the first arm and the second arm to the press-in direction (leftward in FIG. 19), the boss member 11 of the anti-vibration device 810 is made to abut upon the inclined surface IJa of the press-in jig IJ, and these first arm and second arm are further moved to the press-in direction. Thus, while the outer tube member 12 held by the first arm is moved horizontally to the press-in direction along with the first arm, the boss member 11 held by the second arm is guided on the inclined surface IJa of the press-in jig IJ, is thereby moved to the press-in direction while rising in the axis O direction along with the second arm along the inclined surface IJa (that is, while compressively deforming the anti-vibration device 810 in the axis O direction), and is pressed in to the press-fitting section 35 in the fixing member 31 of the second bracket 30 upon going beyond the final end of the inclined surface IJa.

Thus, with respect to the press-in device, by applying only the load toward the press-in direction (the direction orthogonal to the axis O) of the anti-vibration device 810 by the first arm and the second arm, the lower surface of the press-in section (the extension section 11c) of the boss member 11 is slid along the inclined surface IJa, and thereby the boss member 11 of the anti-vibration device 810 can be fixed to the fixing member 31 (the press-fitting section 35) of the second bracket 30 with the anti-vibration base 813 of the anti-vibration device 810 compressed in the axis O direction. That is, the step of pressing in the boss member 11 of the anti-vibration device 810 to the fixing member 31 (the press-fitting section 35) of the second bracket 30 for fixing and the step for compressing the anti-vibration device 810 in the axis O direction can be effected simultaneously. Thus, execution of the step of compressing the anti-vibration device 810 in the axis O direction separately from the press-in step is not required, and the man-hours during manufacturing can be reduced. Also, the structure of the press-in device can be simplified, and the facility cost for pressing in the boss member 811 of the anti-vibration device 810 to the fixing member 31 (the press-fitting section 35) of the second bracket 30 can be reduced.

The present invention has been described above based on the embodiments. However, it can be easily presumed that the present invention is not limited to the embodiments described above, and a variety of improvements and alterations are possible within the scope not departing from the objects of the present invention.

The figures cited in the respective embodiments described above are only an example, and it is naturally possible to employ other figures. Also, in the respective embodiments described above, the drawings are simplified, and, respective configurations are illustrated schematically in order to facilitate understanding. Therefore, it is naturally possible to change the scale of the respective configurations (for example, to increase or decrease the thickness dimension of the rubber membrane 13a, 413a).

In the respective embodiments described above, although a case where the extension section 11c, 511c was formed into a rectangular shape in the front view was described, the present invention is not necessarily limited to it, and an inclined surface may be arranged in a part in the shape in the front view. An example of this aspect will be described as a modification of the fifth embodiment referring to FIG. 20 and FIG. 21. Also, with respect to the same portions as those of the respective embodiments described above, the same reference signs will be given, and description thereof will be omitted.

FIG. 20(a) is a partially enlarged front view of the anti-vibration device 510 in the modification, and FIG. 20(b) is a bottom view of the boss member 511 as viewed in the direction of the arrow XXb of FIG. 20(a). Also, FIG. 21(a) is a partially enlarged cross-sectional view of the anti-vibration unit 501 after pressing-in, and FIG. 21(b) is a partially enlarged front view of the anti-vibration unit 501 after pressing-in. Further, in FIG. 20(b), illustration of the anti-vibration base 13, the outer tube member 12 and the like is omitted.

As shown in FIG. 20, with respect to the extension section 511c, the ridge line section (the corner) of the lower surface and the outer peripheral surface thereof is cut off linearly, and thereby an inclined surface 511c1 that inclines upward to the outer periphery side is formed continuously in the peripheral direction on the lower surface side (the lower side in FIG. 20(a)) of the extension section 511c. That is, the inclined surface 511c1 is formed into an annular shape with the axis O at its center in the bottom view shown in FIG. 20(b). As a result, the extension section 511c is formed into a trapezoidal shape in the front view (that is, as viewed in the direction orthogonal to the axis O).

Therefore, in pressing in the extension section 511c to the press-fitting section 35, the thickness dimension on the outer periphery side of the extension section 511c is made small, and the extension section 511c can be easily inserted to the extension section press-fitting space 36 of the press-fitting section 35.

Also, with the inclined surface 511c1 formed in the extension section 511c, as shown in FIG. 21(b), a space can be formed between the extension section 511c and the inner wall surface (the side surface and the lower surface) of the extension section press-fitting space 36 of the press-fitting section 35. Therefore, the scraping chips generated in pressing in the extension section 511c to the press-fitting section 335 (the extension section press-fitting space 36) can be stored. Particularly, by forming the inclined surface 511c1 only on the lower surface side and having the formation region thereof as the required minimum, while the strength of the extension section 511c and the engagement area (that is, the engagement strength) with the inner wall surface of the extension section press-fitting space 36 are secured, the scraping chips having dropped on the bottom surface of the extension section press-fitting space 36 in pressing-in can be efficiently stored.

Also, because the inclined surface 511c1 is formed continuously in the peripheral direction and the boss member 511 is formed into a symmetric shape around the axis O, it is not necessary to consider the orientation in the peripheral direction. Therefore, in arranging work in the vulcanizing mold at the time of vulcanizing molding and the press-in work of the anti-vibration device 510 to the first bracket 20 (the first bracket holding step; refer to FIG. 2), the work for positioning in the peripheral direction can be omitted, and the man-hours during manufacturing can be reduced.

Further, the formation position of the inclined surface 511c1 is not limited to the lower surface side (the lower side in FIG. 20(a)) of the extension section 511c, and alternatively or additionally, it may be formed on the upper surface side (the upper side in FIG. 20(a)) of the extension section 511c.

Also, the application object of the present modification in which this inclined surface is formed is not limited to the extension section 511c of the boss member 511 in the fifth embodiment, and the inclined surface may also be arranged in the boss members 11, 711 in other embodiments. When the inclined surface is to be formed in the extension section 11c of the boss member 11, it is preferable to form the surface not only on the right/left side (the right/left side in FIG. 3(a)) in the front view but also on the press-in direction side (the left side in FIG. 6(a)). Particularly, in the case of an aspect including the positioning wall 239, 339, by forming the inclined surface on the press-in direction side of the extension section 11c, the storage performance of the scraping chips generated in pressing-in can be improved, and the positional accuracy of the press-in position can be secured.

Further, when the entire extension section 11c of the boss member 11 is covered by the rubber membrane 413a as the anti-vibration device 410 in the fourth embodiment, the rubber membrane 413a that becomes the excess margin in pressing-in can be stored in the space formed between the inclined surface of the extension section 11c and the inner wall surface of the extension section press-fitting space 36 by forming the inclined surface in the extension section 11c. Therefore, the engagement strength between the boss member 11 and the press-fitting section 35 can be secured.

In the third embodiment, although a case was described where the groove section 339a of a groove shape was formed in a part of the surface on the side facing the extension section press-fitting space 36 of the positioning wall 339, the present invention is not necessarily limited to it, and other aspects are naturally possible. A first example of such other aspects will be described as a modification of the third embodiment referring to FIG. 22 and FIG. 23. Also, with respect to the same portions as those of the respective embodiments described above, the same reference signs will be given, and description thereof will be omitted.

FIG. 22(a) is a partially enlarged cross-sectional view of the second bracket 330 in the modification, and FIG. 22(b) is a partially enlarged rear view of the second bracket 330 as viewed from the direction of the arrow XXIIb of FIG. 22(a). Also, FIG. 23(a) is a partially enlarged cross-sectional view of the anti-vibration unit 301 after pressing-in, and FIG. 23(b) is a partially enlarged front view of the anti-vibration unit 301 after pressing-in.

As shown in FIG. 22, in the positioning wall 339 in the modification, a groove section 339b is recessively arranged in the entire surface facing the extension section press-fitting space 36. That is, with respect to the positioning wall 339, of the surface facing the extension section press-fitting space 36 and the shaft section press-fitting space 37 (the right side surface in FIG. 22(a)), only the surface facing the extension section press-fitting space 36 is recessively arranged, and this portion recessively arranged is made to be the groove section 339b.

Therefore, when the press-in section of the boss member 11 is pressed in to the press-fitting section 335 of the fixing member 331 as shown in FIG. 23, the shaft section 11b of the boss member 11 is made to abut upon the positioning wall 339, and the press-in position thereof is positioned to the prescribed position. In this case, the scraping chips generated in pressing-in can be surely stored in the groove section 339b, because the groove section 339b is recessively arranged in the entire surface facing the extension section press-fitting space 36, and as a result, the positional accuracy of the press-in position of the boss member 11 can be secured.

A second example in which the groove section 339a is another aspect will be described as a modification of the third embodiment referring to FIG. 24 and FIG. 25. Also, with respect to the same portions as those of the respective embodiments described above, the same reference signs will be given, and description thereof will be omitted.

Figure 24B:
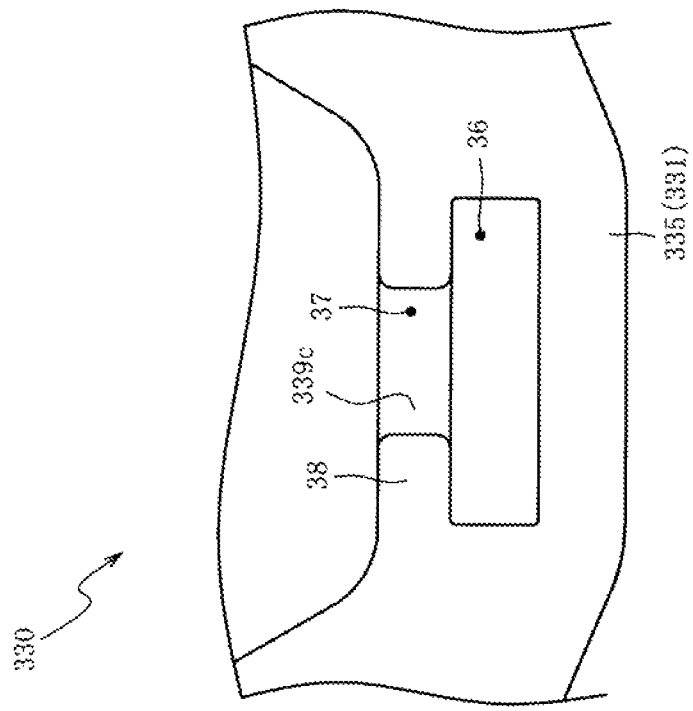
FIG. 24 (a) is a partially enlarged cross-sectional view of the second bracket in the modification, and (b) is a partially enlarged rear view of the second bracket as viewed from the direction of the arrow XXIVb of FIG. 24(a).
Figure 24A:
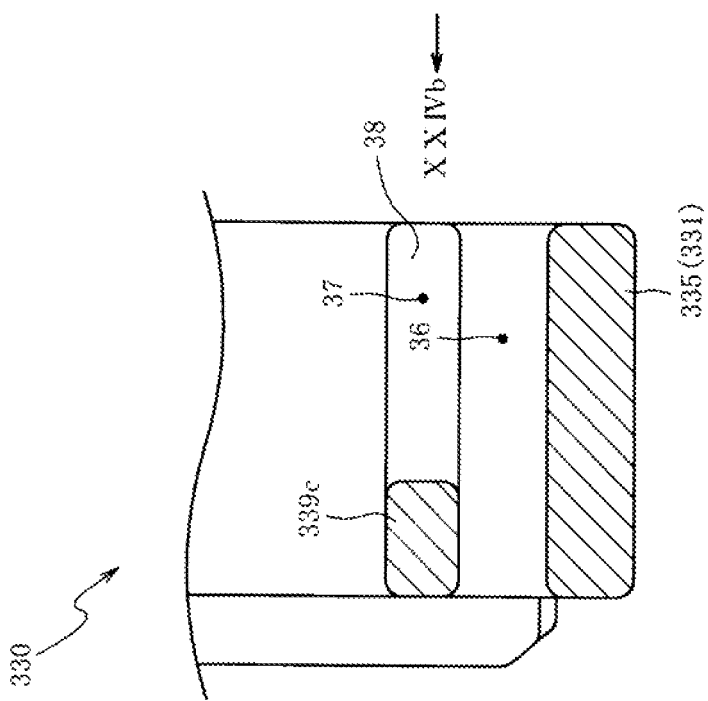
Figure 25B:
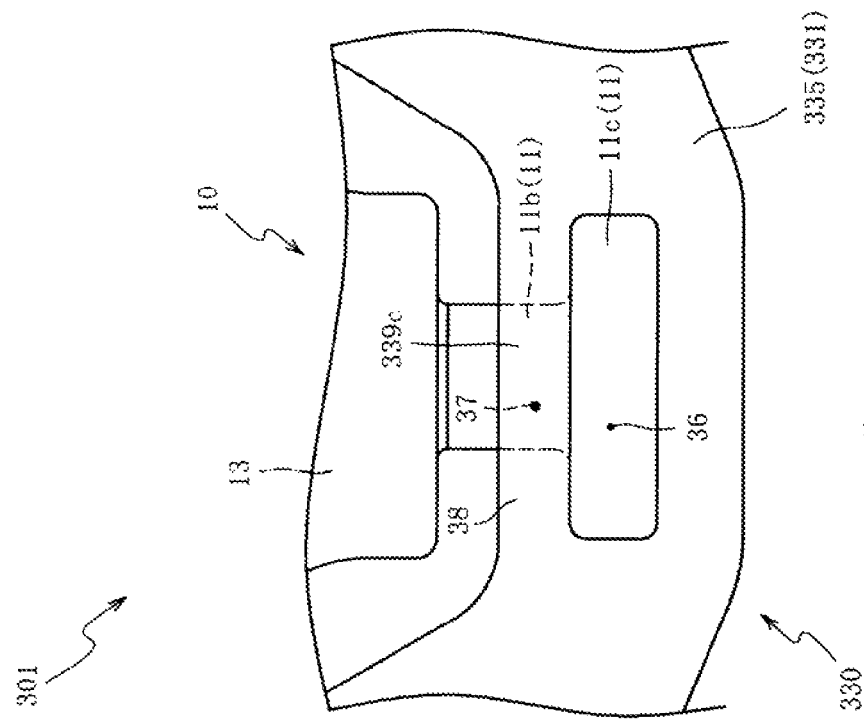
Figure 25A:
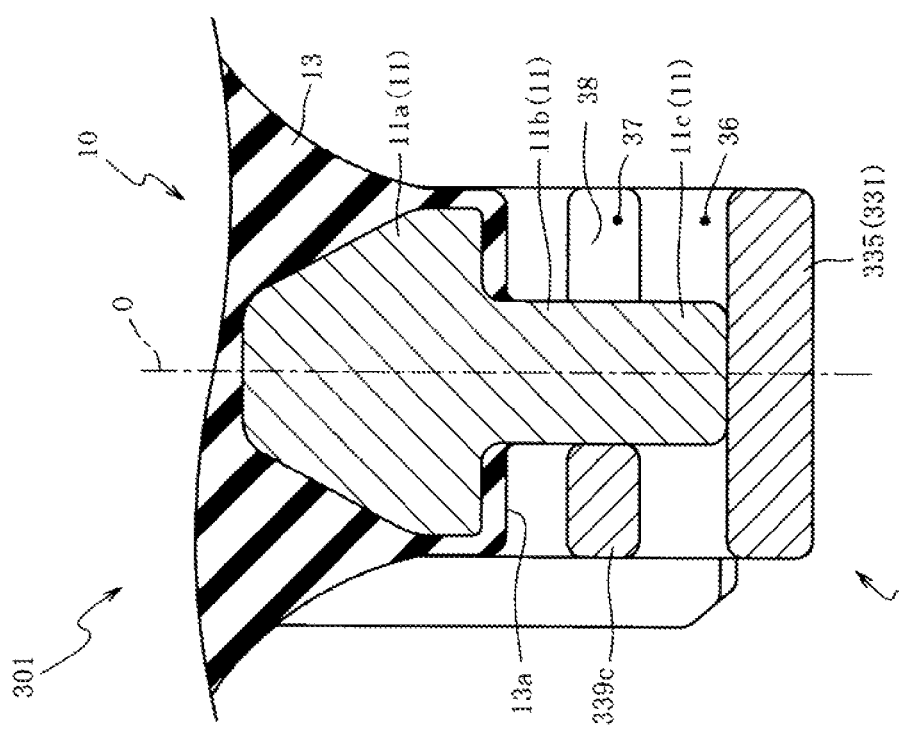

FIG. 24(a) is a partially enlarged cross-sectional view of the second bracket 330 in the modification, and FIG. 24(b) is a partially enlarged rear view of the second bracket 330 as viewed from the direction of the arrow XXIVb of FIG. 24(a). Also, FIG. 25(a) is a partially enlarged cross-sectional view of the anti-vibration unit 301 after pressing-in, and FIG. 25(b) is a partially enlarged front view of the anti-vibration unit 301 after pressing-in.

As shown in FIG. 24, in a positioning wall 339c in the modification, the entire surface facing the extension section press-fitting space 36 is openingly formed. That is, the positioning wall 339c is formed into a rectangular parallelepiped shape that connects a pair of the restriction walls 38 with each other, and is formed only in a portion corresponding to the shaft section press-fitting space 37. Therefore, with respect to the extension section press-fitting space 36, both sides in the press-in direction (the start end side and the final end side) open to the side surfaces on both sides (the right side and the left side in FIG. 24(a)) of the fixing member 331.

Therefore, as shown in FIG. 25, when the press-in section of the boss member 11 is pressed in to the press-fitting section 335 of the fixing member 331, the shaft section 11b of the boss member 11 is made to abut upon the positioning wall 339c, and the press-in position thereof is positioned to a prescribed position. In this case, the positioning wall 339c is not formed in a portion corresponding to the extension section press-fitting space 36, thus the scraping chips generated in pressing-in can be discharged to the outside, and it is possible to avoid catching the scraping chips between the extension section 11c and the positioning wall 339c. As a result, the positional accuracy of the press-in position of the boss member 11 can be secured.

In the eighth embodiment, although a case was described where, the press-in jig IJ was utilized in order to compress the anti-vibration device 810 in the axis 0 direction, the present invention is not necessarily limited to it, and it is naturally possible to employ other methods. An example of the other methods will be described as a modification of the eighth embodiment referring to FIG. 26. Also, with respect to the same portions as those of the respective embodiments described above, the same reference signs will be given, and description thereof will be omitted.

From FIG. 26(a) to FIG. 26(c) are cross-sectional views showing the process of pressing-in of the anti-vibration unit 801 in the modification, FIG. 26(a) corresponds to a state before pressing-in, FIG. 26(b) corresponds to a state in the middle of pressing-in, and FIG. 26(c) corresponds to a state after pressing-in respectively.

As shown in FIG. 26(a), in the bottom surface on the start end side in the press-in direction (the right side in FIG. 26(a)) of the extension section press-fitting space 36 of the second bracket 30 in the modification, an inclined surface 36a is formed which is inclined upward from the start end side of the press-in direction to the final end side (the left side in FIG. 26(a)). Also, with respect to the extension section press-fitting space 36, the distance between opposing surfaces of an inner wall surface 36b of a region corresponding to the inclined surface 36a (the back side and the front side of the paper surface in FIG. 26(a)) is made equal to or slightly larger than the width dimension (the dimension in the direction vertical to the paper surface in FIG. 26(a)) of the extension section 11c of the boss member 11 pressed in. Therefore, the width dimension (the dimension in the direction vertical to the paper surface in FIG. 26(a)) of the inclined surface 36a is also made equal to or slightly larger than the width dimension of the extension section 11c of the boss member 11.

On the other hand, in the extension section 11c of the boss member 11 in the modification, an inclined surface 11c1 is formed in the lower surface on the press-in direction side (the left side in FIG. 26(a)). That is, the inclined surface 11c1 is formed by cutting off the ridge section (the corner) between the side surface on the press-in direction side and the lower surface of the extension section 11c, and is inclined at an inclination angle equal to that of the inclined surface 36a of the extension section press-fitting space 36 in the press-in attitude (a state where the axis O is orthogonal to the press-in direction (the arrow A direction)).

Also, the configuration of the press-in device used in pressing in the boss member 11 (the press-in section) of the anti-vibration device 810 to the fixing member 31 (the press-fitting section 35) of the second bracket 30 is similar to that of the case of the eighth embodiment. Therefore description thereof will be omitted.

From the state shown in FIG. 26(a), by movement of the first arm that holds the first bracket 20 and the second arm that holds the boss member 11 to the press-in direction (the arrow A direction), the inclined surface 11c1 in the extension section 11c of the boss member 11 is made to abut upon the inclined surface 36a in the extension section press-fitting space 36 of the press-fitting section 35, and these first arm and second arm are further moved to the press-in direction.

Thus, while the outer tube member 12 is moved horizontally to the press-in direction along with the first arm, the boss member 11 held by the second arm is guided on the inclined surface 36a of the extension section press-fitting space 36, is thereby moved to the press-in direction while rising in the axis O direction along with the second arm along the inclined surface 36a (that is, while compressively deforming the anti-vibration device 810 in the axis O direction), and is pressed in to the press-fitting section 35 in the fixing member 31 of the second bracket 30 upon going beyond the final end of the inclined surface 36a.

Therefore, in the present modification also, similarly to the case of the eighth embodiment, the step of pressing in the boss member 11 of the anti-vibration device 810 to the fixing member 31 (the press-fitting section 35) of the second bracket 30 for fixing and the step of compressing the anti-vibration device 810 in the axis O direction can be effected simultaneously, and the man-hours during manufacturing can be reduced. Also, the structure of the press-in device can be simplified, and the facility cost for pressing in the boss member 11 of the anti-vibration device 810 to the fixing member 31 (the press-fitting section 35) of the second bracket 30 can be reduced. Further, in the present modification, the press-in jig IJ is not required, and the facility cost can be reduced correspondingly.

In the first to sixth embodiments and the eighth embodiment, although a case was described where the cross-sectional shape of the extension section press-fitting space 36 was constant along the press-in direction, the present invention is not necessarily limited to it, and the cross-sectional shape of the extension section press-fitting space 36 may be made into a cross-sectional shape equal to or slightly larger than that of the extension section 11c at least in a part on the start end side in the press-in direction. Thus, generation of the scraping chips can be suppressed.

In the first to sixth embodiments and the eighth embodiment, although a case was described where the cross-sectional shape (the shape as viewed in the press-in direction) of the extension section press-fitting space 36 was made similar to the cross-sectional shape (the shape as viewed in the press-in direction) of the extension section 11c, 511c (that is, a case where all surfaces of the upper surface, bottom surface and side surface of the inner wall surfaces of the extension section press-fitting space 36 have the press-in allowance), the present invention is not necessarily limited to it. For example, only the upper surface and the bottom surface of the extension section press-fitting space 36 may have the press-in allowance, or only the side surface of the extension section press-fitting space 36 may have the press-in allowance.

The configuration of some or all of the respective embodiments or modifications described above may be combined with or may be replaced by the configuration of the other embodiments or the modifications. For example, an aspect is exemplified in which the groove section 339a in the third embodiment is added to the surface that faces the extension section press-fitting space 36 of the positioning wall 639 in the sixth embodiment.

The invention claimed is:

1. An anti-vibration unit, comprising:
    an anti-vibration device that includes a boss member, a cylindrical outer tube member that is coaxially disposed above the boss member, and an anti-vibration base that connects the outer tube member and the boss member to each other and is formed of a rubber-like elastic body;
    a first bracket that holds the anti-vibration device by pressing the outer tube member of the anti-vibration device in the axial direction and is attached to a vibration source side; and
    a second bracket that includes a fixing member to which the boss member of the anti-vibration device is fixed, a pair of erection members that are erected upward from both sides of the fixing member and are disposed so as to oppose each other with the anti-vibration device in between, and a connection member that connects erection distal ends of the pair of erection members to each other and is disposed so as to oppose the fixing member with the anti-vibration device in between, and is attached to a vehicle body side,
    wherein the boss member of the anti-vibration device includes a press-in section, the fixing member of the second bracket includes a press-fitting section, the press-in section of the boss member is pressed in to the press-fitting section of the fixing member, and the boss member of the anti-vibration device is thereby fixed to the fixing member of the second bracket,
    wherein said boss member includes a wide base section that is surrounded by said rubber-like elastic body of said anti-vibration base, a narrow shaft section that projects from a lower surface side of the base section, and a wide extension section at a distal end of the shaft section, said wide extension section forming said press-in section of the boss member and being sized to press-fit into said press-fitting section of the fixing member,
    wherein the press-fitting section of the fixing member includes a positioning wall that is formed at a final end that is on the opposite side of the opening in the side surface of the fixing member, abuts upon the press-in section of the boss member pressed in through the opening, and restricts the pressing-in,
    wherein the extension section of the press-in section of the boss member is formed into a disk shape,
    wherein the positioning wall of the press-fitting section of the fixing member is formed so as to curve in an arc shape corresponding to the disk shape of the extension section, and
    the positioning wall includes a positioning-wall opening that is formed on the opposite side of the opening in the side surface of the fixing member.

2. The anti-vibration unit according to claim 1,
    wherein the boss member includes said base section to which the anti-vibration base is connected, said shaft section that is projected from said lower surface side of the base section, and said extension section that is extended outward in the radial direction in a projection distal end of the shaft section;
    the press-fitting section of the fixing member includes an extension section press-fitting space that is formed as a space having a cross-sectional shape corresponding to the external shape of the extension section and opens to a side surface of the fixing member, and a shaft section press-fitting space that communicates with the extension section press-fitting space, is formed as a space having a cross-sectional shape where the shaft section at least can pass through, and opens to a side surface and an upper surface of the fixing member; and
    the press-in section of the boss member, which includes said shaft-like section and said extension section, is pressed in to the press-fitting section of the fixing member through an opening in the side surface of the fixing member along a direction orthogonal to the axis of the anti-vibration device.

3. The anti-vibration unit according to claim 1,
    wherein the boss member is formed into an axially symmetric shape and is disposed coaxially with the axis of the anti-vibration device.

4. The anti-vibration unit according to claim 1,
    wherein at least a distal end of said shaft section and said wide extension section are exposed from said rubber-like elastic body of said anti-vibration base.

5. The anti-vibration unit according to claim 1,
    wherein said rubber-like elastic body of said anti-vibration base extends under said lower surface side of the base section.

6. The anti-vibration unit according to claim 5,
    wherein said boss member is made with metal and said narrow shaft section and said metal of said wide extension section is sized to press-fit into said press-fitting section of the fixing member.

7. The anti-vibration unit according to claim 6,
    wherein said boss member is made with a metal alloy.

8. The anti-vibration unit according to claim 7,
    wherein said boss member is made with an aluminum alloy.

* * * * *